United States Patent [19]
Klinner et al.

[11] 3,977,165
[45] Aug. 31, 1976

[54] CONDITIONING CROPS

[75] Inventors: Wilfred Erwin Klinner, Bletchley; Alan Winston Harris, Hitchin, both of England

[73] Assignee: National Research Development Corporation, London, England

[22] Filed: May 24, 1973

[21] Appl. No.: 363,313

Related U.S. Application Data
[62] Division of Ser. No. 245,819, April 20, 1972, abandoned.

[30] Foreign Application Priority Data
Dec. 8, 1971 United Kingdom............... 57064/71

[52] U.S. Cl................................. 56/16.4; 56/16.5
[51] Int. Cl.²........................................ A01D 84/00
[58] Field of Search............... 56/DIG. 1, 13.3, 14.3, 56/14.4, 14.5, 500, 289, 14.9, 504, 503, 14.6, 16.5, 16.6, 16.4, 1

[56] References Cited
UNITED STATES PATENTS

| | | | |
|---|---|---|---|
| 2,590,065 | 3/1952 | Mott | 56/289 |
| 2,747,357 | 5/1956 | Bert et al. | 56/DIG. 1 |
| 2,857,946 | 10/1958 | Nikkel | 56/DIG. 1 |
| 3,023,560 | 3/1962 | Krahn | 56/DIG. 1 |
| 3,092,946 | 6/1963 | Matthews | 56/14.9 |
| 3,165,875 | 1/1965 | Mitchell | 56/504 |
| 3,513,646 | 5/1970 | Johnston et al. | 56/14.6 |
| 3,530,650 | 9/1970 | Phillips | 56/13.3 |
| 3,676,988 | 7/1972 | Hauser-Lienhard | 56/1 |
| 3,699,755 | 10/1972 | Hauser | 56/16.4 |
| 3,721,073 | 3/1973 | Scarnato et al. | 56/1 |
| 3,754,384 | 8/1973 | Case et al. | 56/DIG. 1 |

FOREIGN PATENTS OR APPLICATIONS
2,028,607   1/1971   Germany ............................ 56/503

Primary Examiner—Russell R. Kinsey
Assistant Examiner—James D. Hamilton
Attorney, Agent, or Firm—Cushman, Darby & Cushman

[57] ABSTRACT

An agricultural implement for conditioning a crop comprises a plurality of beaters mounted for rotation about a common axis a cutter for cutting a crop, and mounting structure for mounting the beaters and cutter, during a cutting operation, in co-operating relationship such that the beaters engage crop cut by the cutter before said cut crop falls to the ground, and condition the crop. The cutter may be a horizontal reciprocatory cutter mounted across the line of travel of the implement, or may be a rotary drum, disc or like cutter.

Transfer structure may vary the dispositions of the common axis of the beaters, the cutter and the frame of the implement between a first cutting disposition in which the mounting structure mounts the beaters in the co-operating relationship with the cutter, and a second non-cutting disposition in which said cutter is rendered ineffective to cut crop and the mounting structure mounts the beaters in a non co-operating relationship with the cutter such as to engage previously cut crop lying on the ground. The implement may be coupled to a forage harvester including a precision chopper for chopping crop conditioned by the beaters.

9 Claims, 30 Drawing Figures

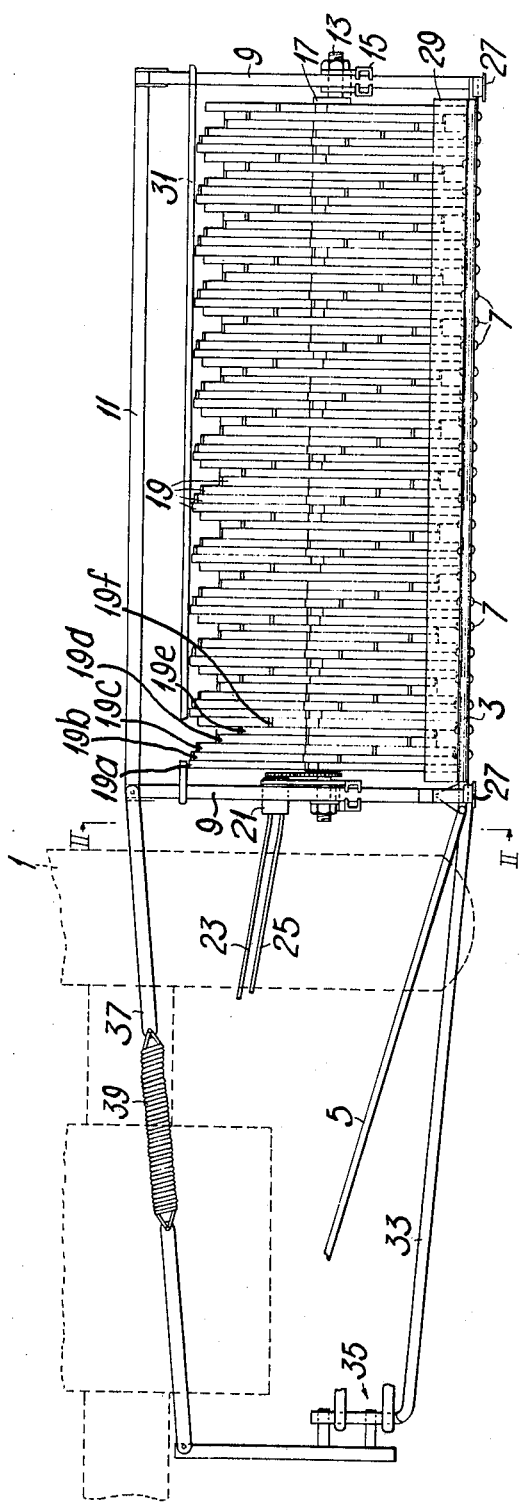
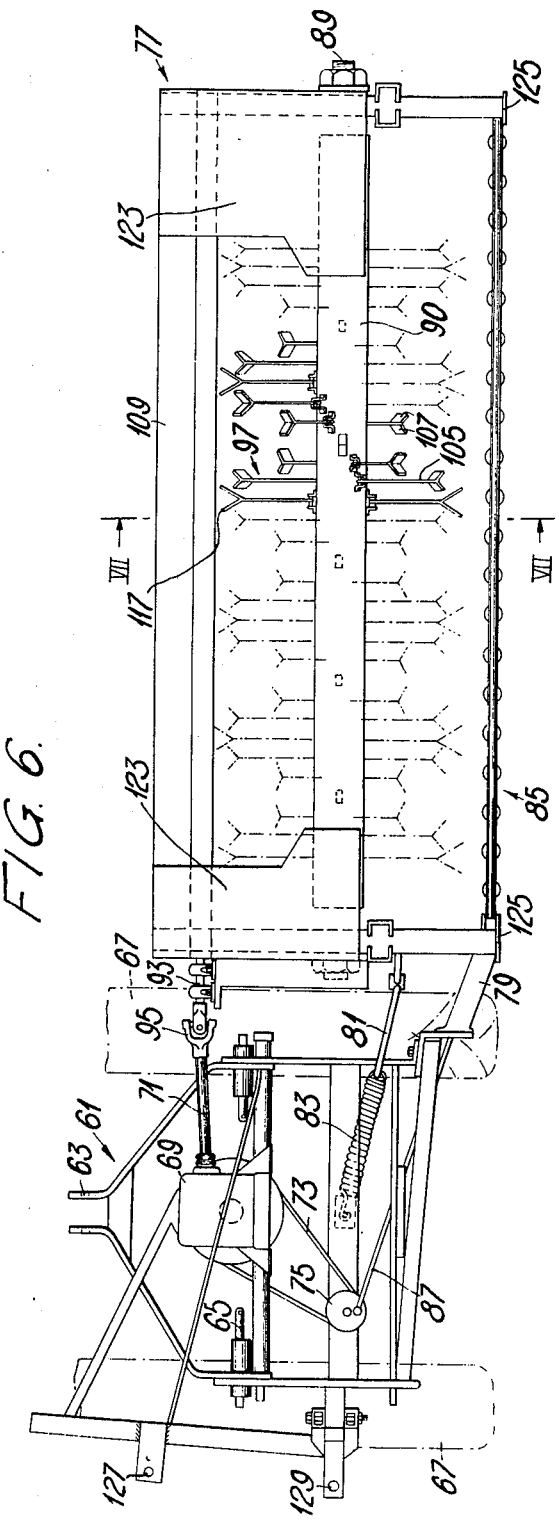

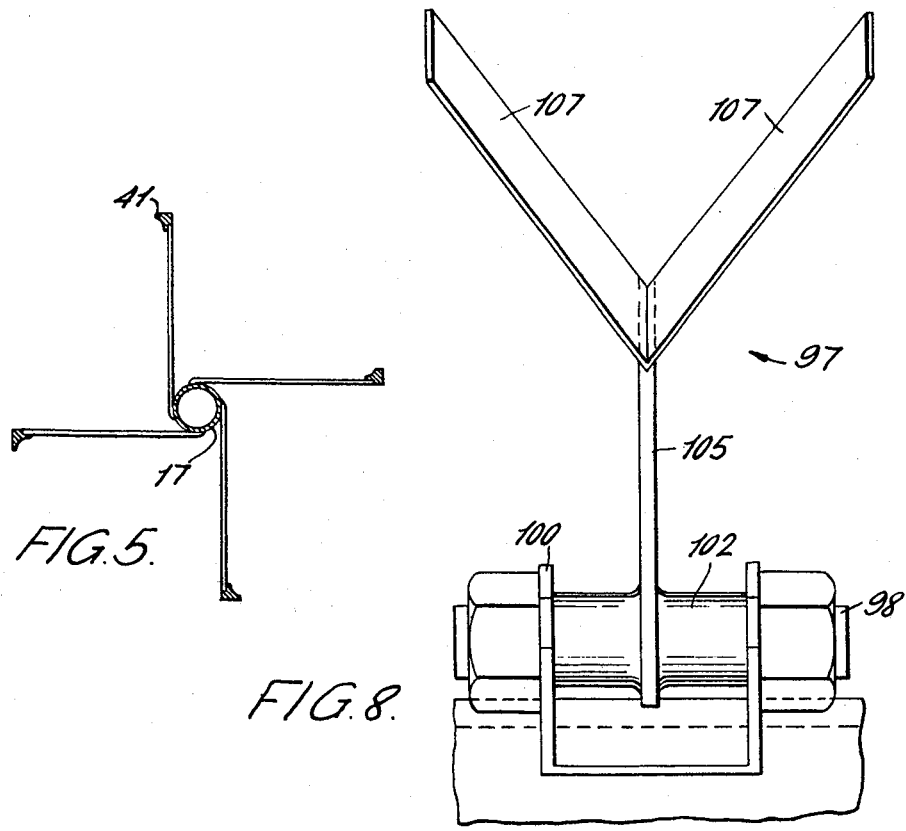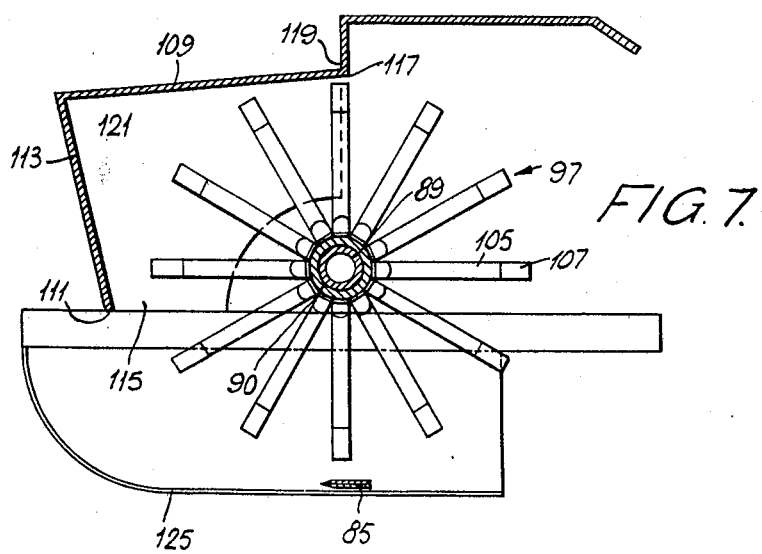

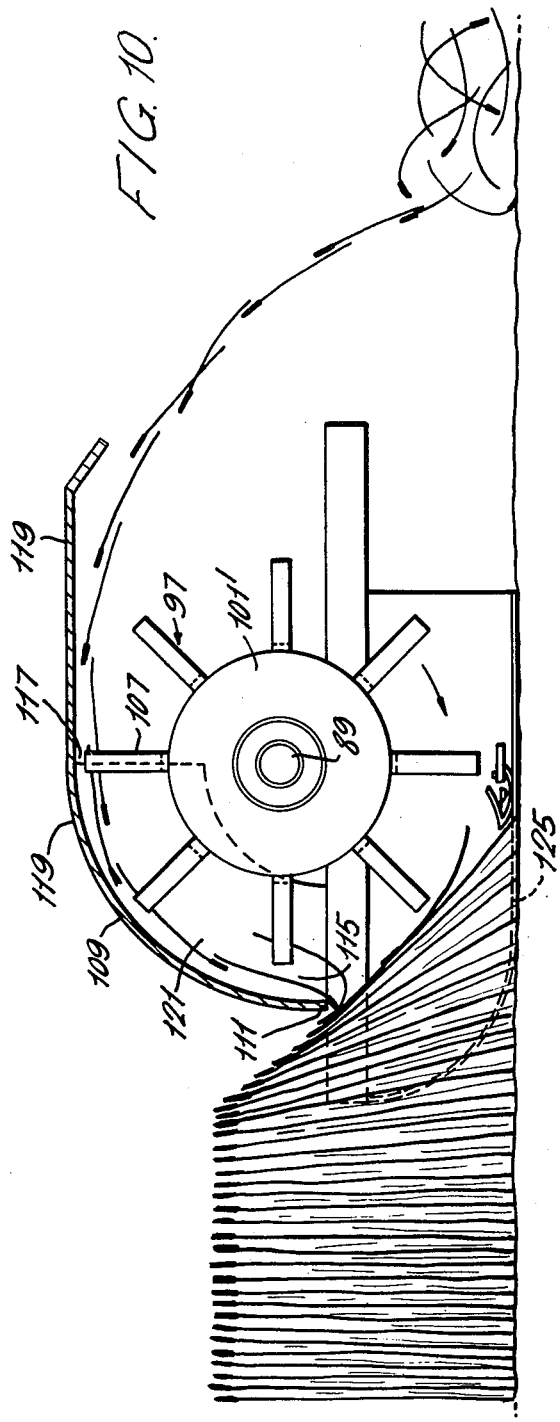
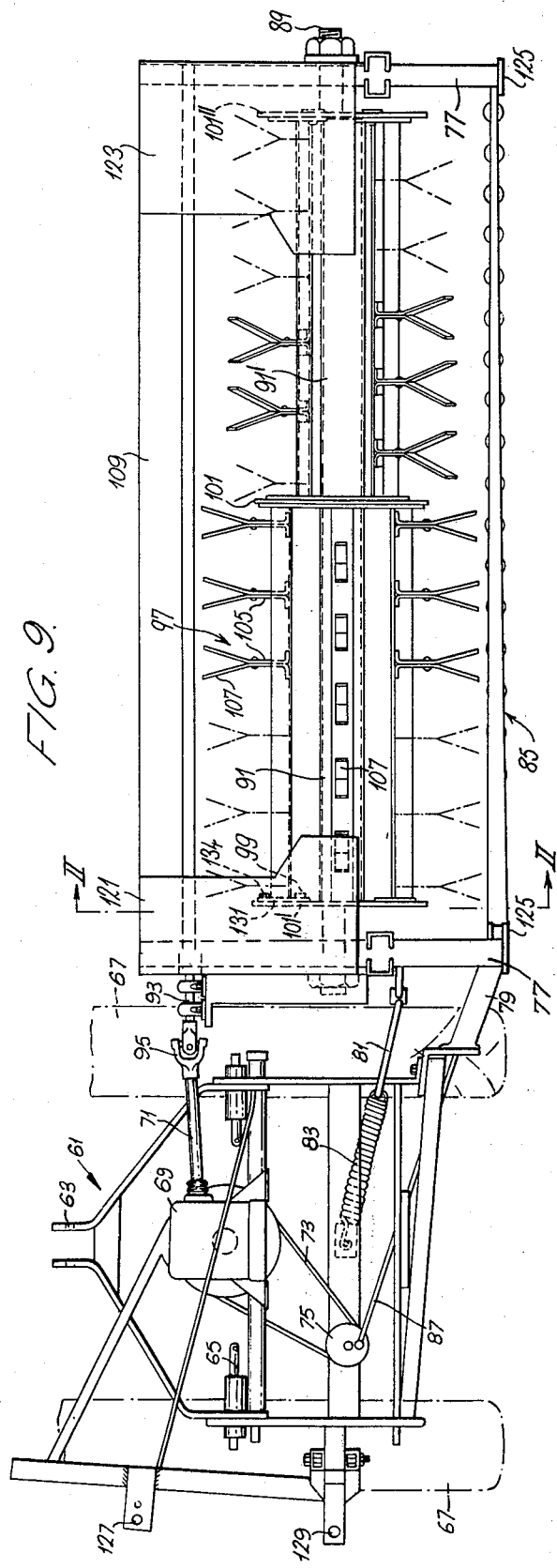

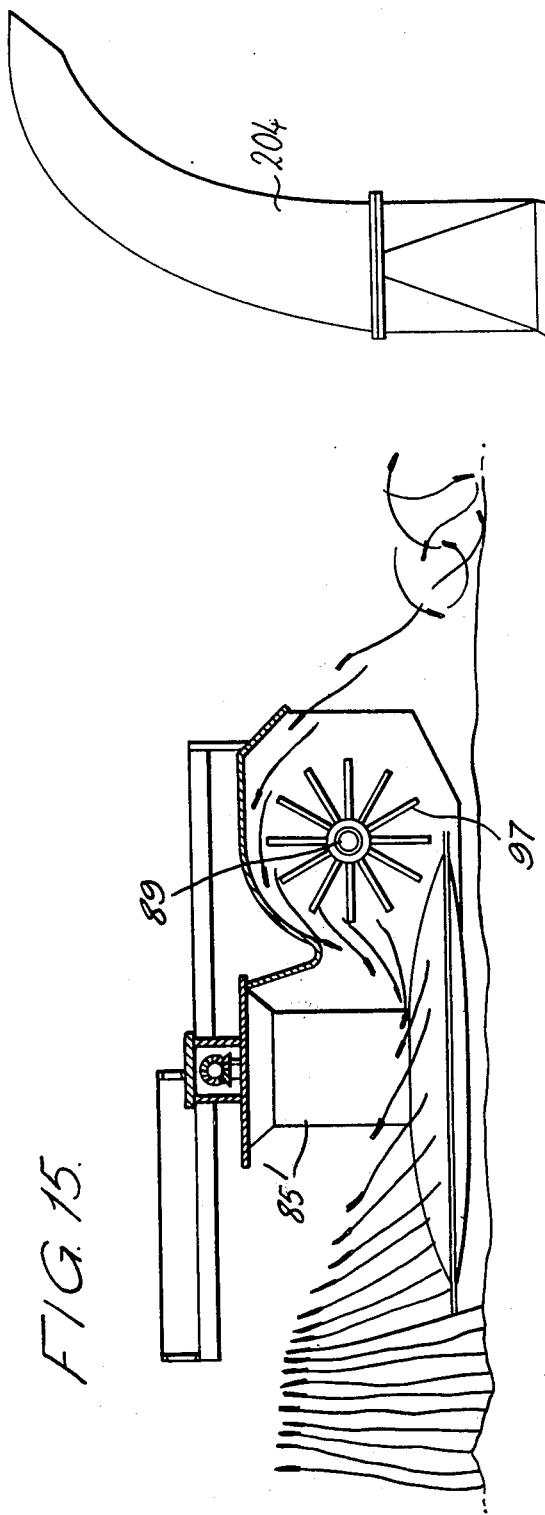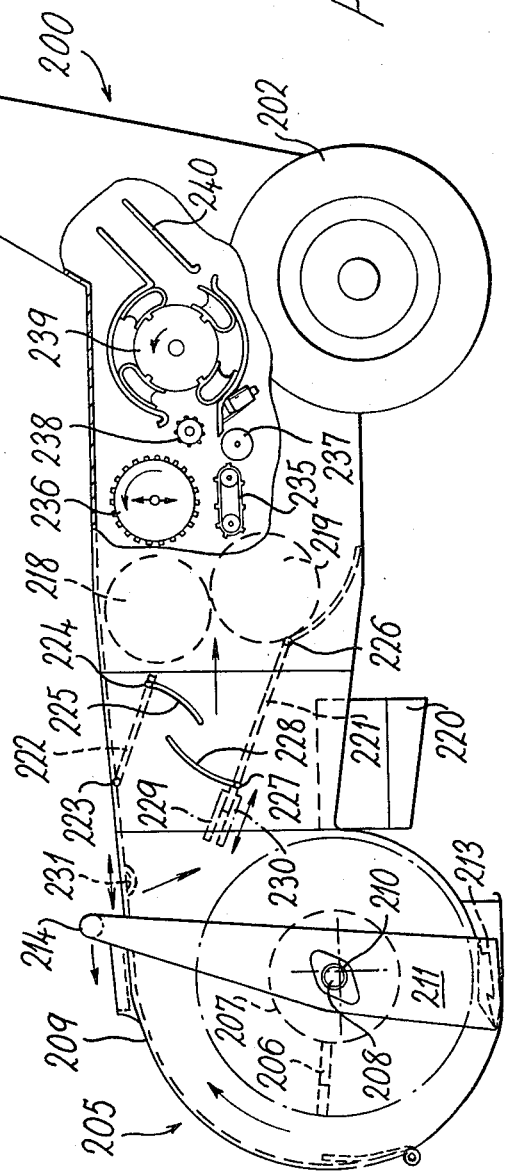

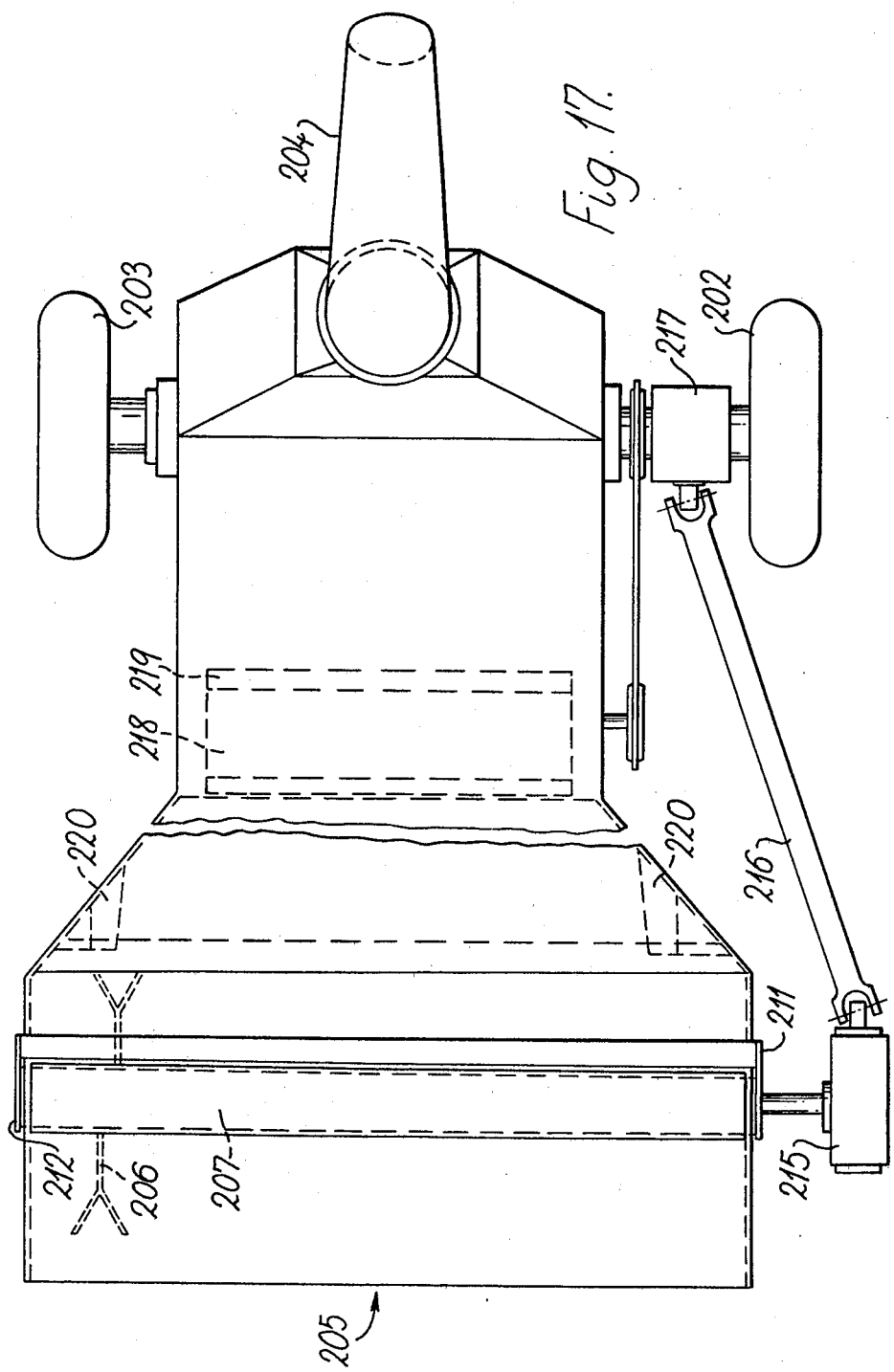

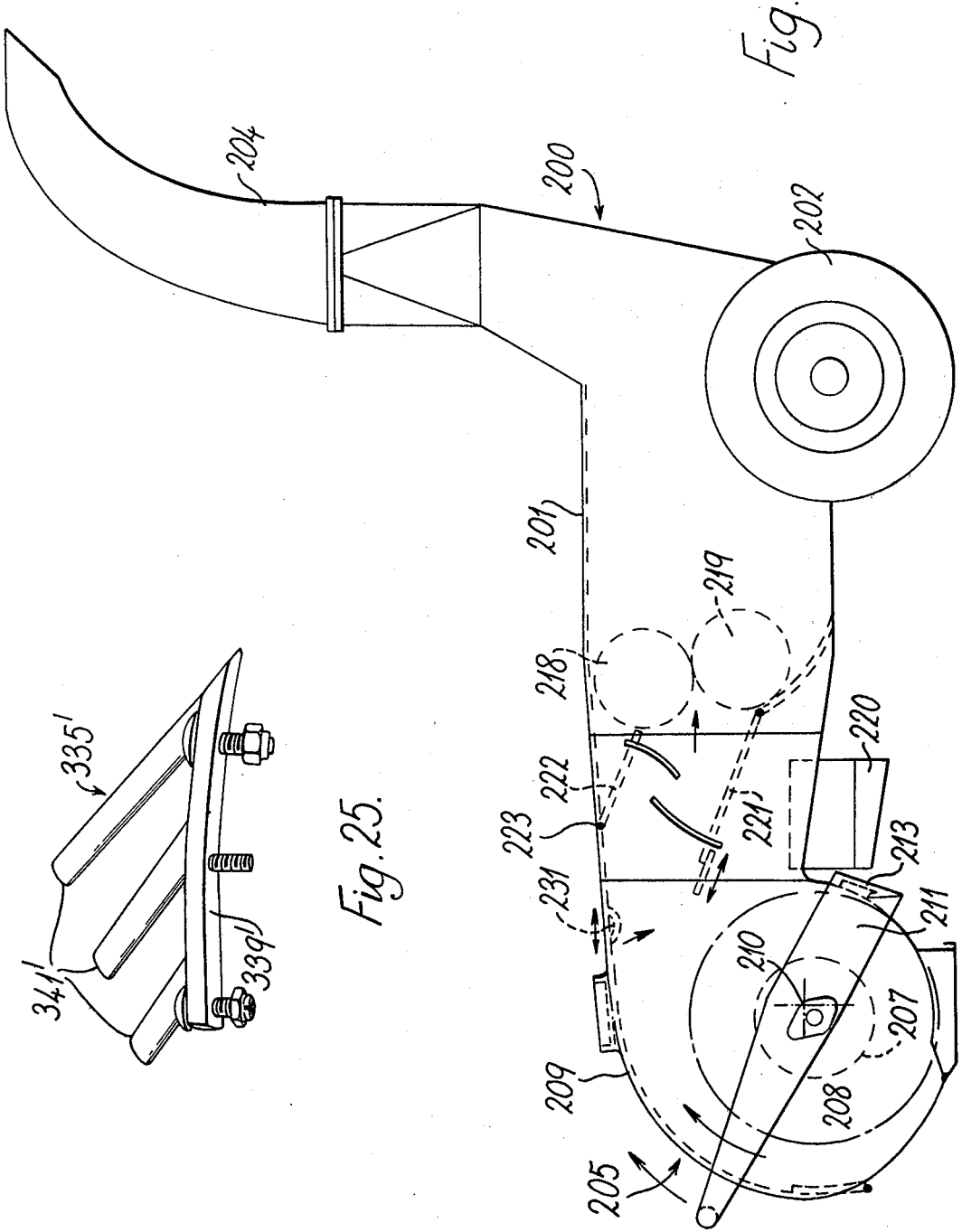

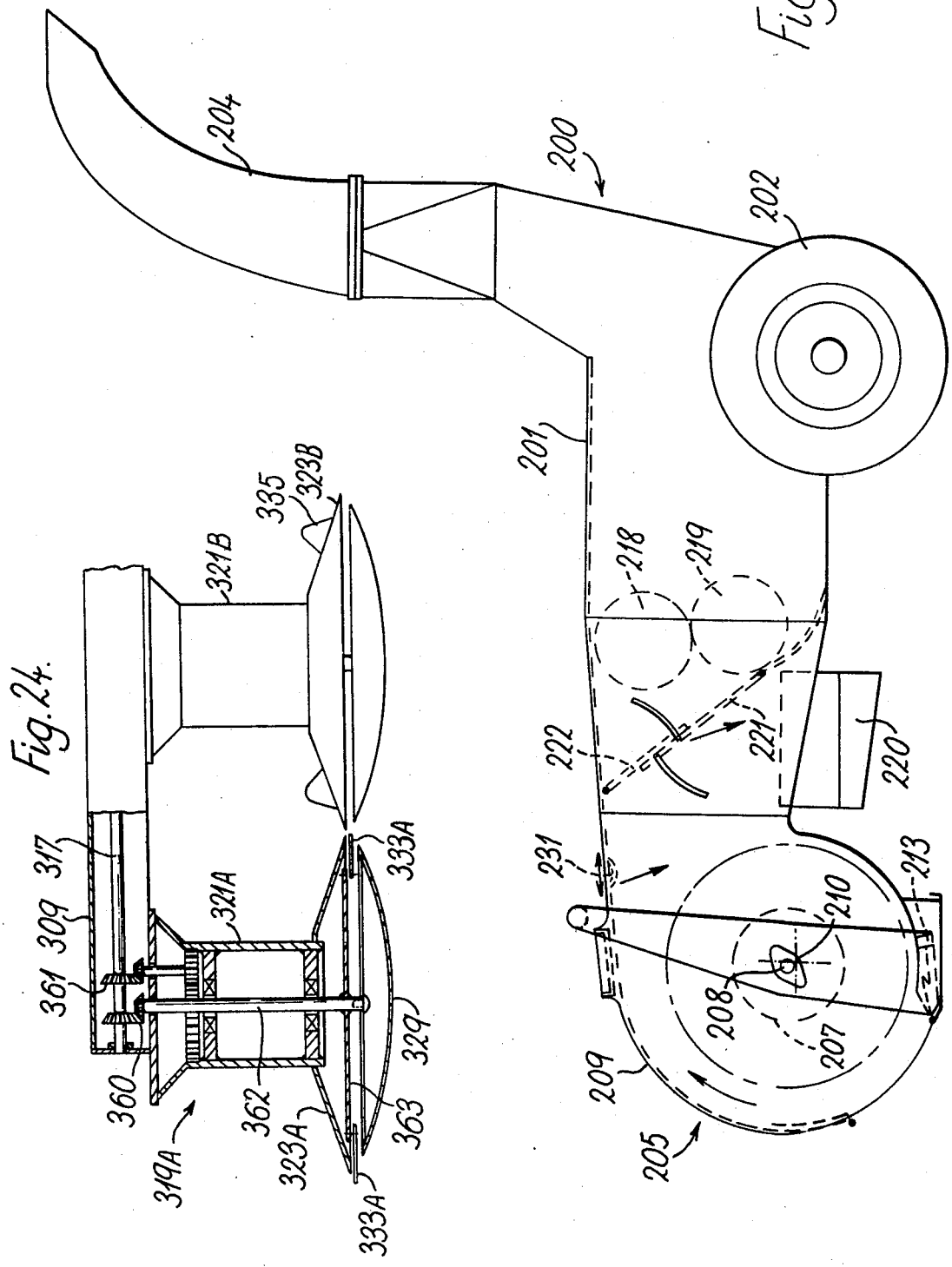

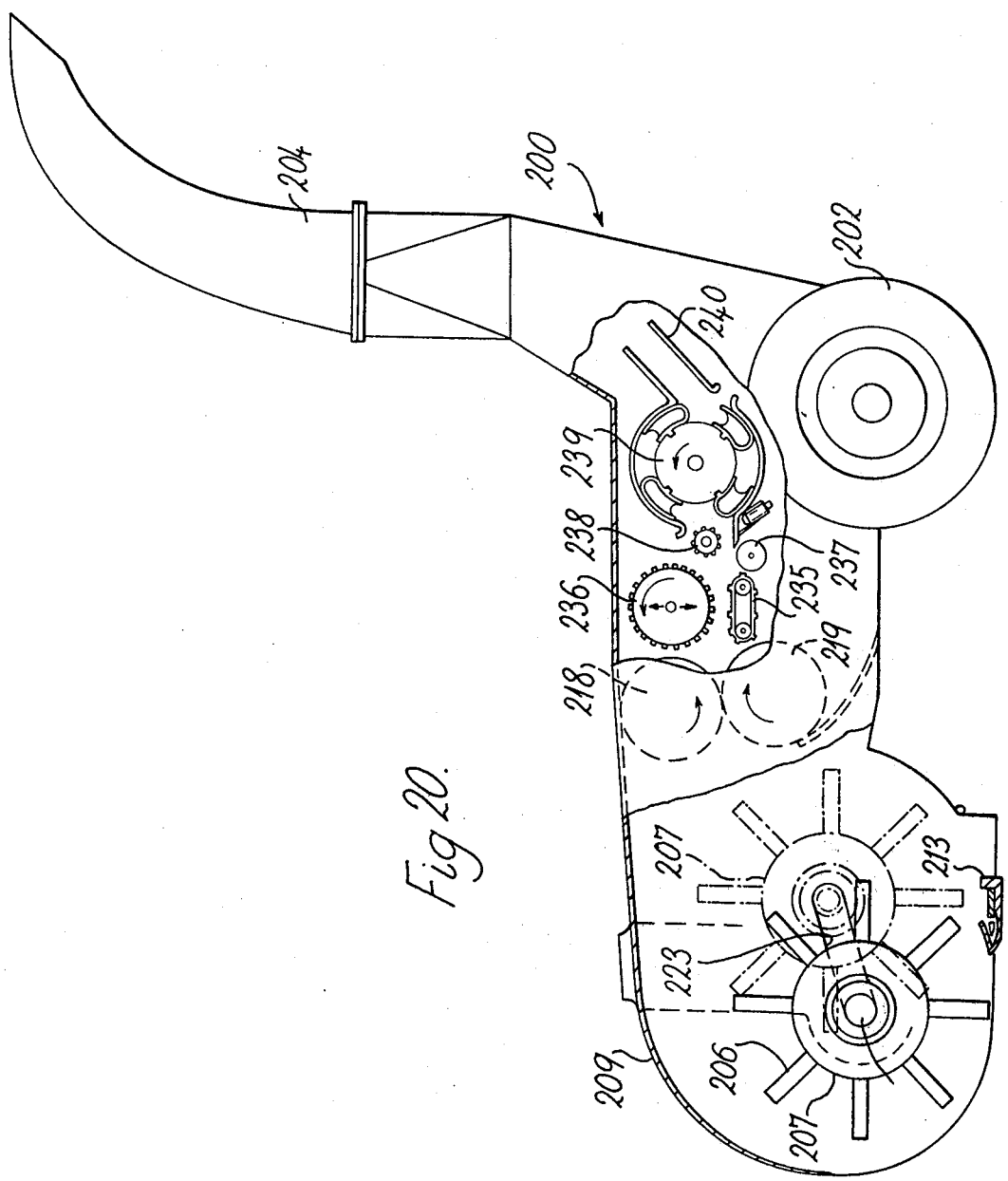

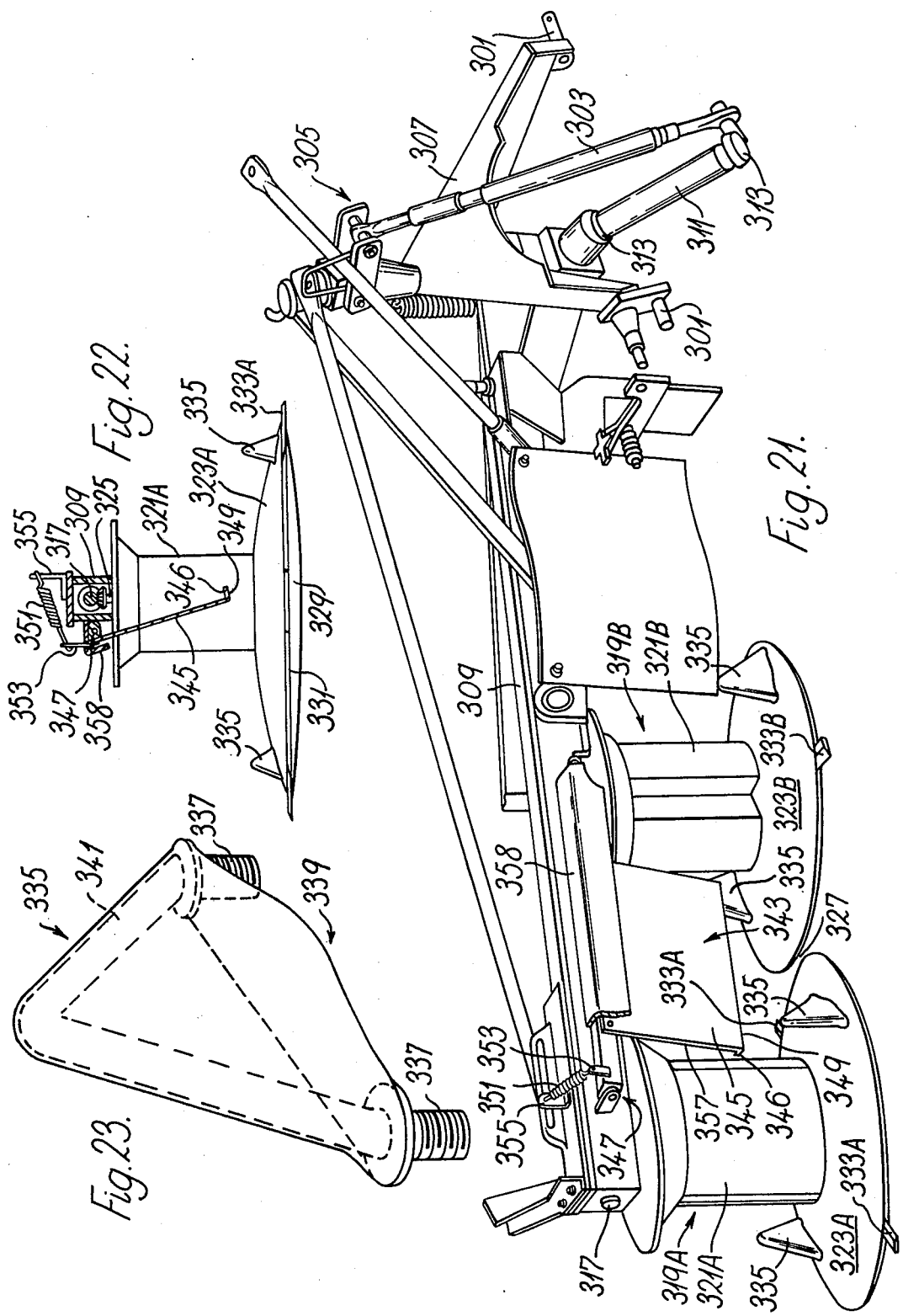

CONDITIONING CROPS

This application is a division of our copending application Ser. No. 245,819, filed Apr. 20, 1972 and now abandoned.

The present invention relates to an implement for conditioning crops.

By conditioning a crop is meant the process, known in itself, of lacerating and bruising the crop in order to improve the properties of the crop. For example, conditioning may be carried out in order to increase the rate of loss of moisture from the crop when it lies in the field after cutting.

It is an object of the present invention to provide an improved implement for conditioning a crop.

According to the present invention there is provided an agricultural implement for conditioning a crop comprising a frame, a plurality of beaters for conditioning crop, first mounting means for mounting said beaters on said frame for rotation about a common axis, a cutter, said cutter having at least one cutting element for cutting a crop by movement of said cutting element relative to said frame, second mounting means mounting said cutting element or elements independently of said beaters, and means for driving said beaters in rotation about said axis, said first mounting means in cutting operation of said implement mounting said beaters in co-operating relationship with said cutter to engage crop cut by said cutter before said cut crop falls to the ground and to condition said crop.

Preferably the frame and the beaters are so arranged that in operation the common axis of rotation of the beaters is substantially horizontal and extends across the intended direction of travel of the implement, for example at right angles to that direction. By substantially horizontal is meant that the said common axis is horizontal or approximately horizontal when the implement is traversing horizontal ground.

The said first mounting means may mount said beaters with said common axis of rotation substantially directly above said cutter.

An agricultural implement according to the invention may include transfer means for varying the dispositions of said common axis of said beaters, said cutter and said frame between a first cutting disposition in which said first mounting means mounts said beaters in said co-operating relationship with said cutter such as to engage crop cut by said cutter before said cut crop falls to the ground and to condition said crop, and a second non-cutting disposition in which said cutter is rendered ineffective to cut crop and said beaters are positioned in a non-co-operating relationship with said cutter such as to engage previously cut crop lying on the ground.

Said cutter may be a reciprocatory cutter in which said at least one cutting element is reciprocatory across said intended direction of travel of the implement.

Alternatively said cutter may be a rotary cutter in which said at least one cutting element is mounted for rotation about a substantially vertical axis. Such a cutter may be of the type found in rotary mowers such as disc drum or like mowers.

Thus, said first mounting means may comprise at least one concave disc mounted to rotate about a substantially vertical axis with its concave side downwards, said beaters comprise upstanding elements mounted on the upper surface of said concave disc, and said second mounting means mounts said at least one cutting element beneath said concave disc to rotate about the same axis as the beaters cooperating with the disc.

Each upstanding element may comprise a rigid structure of triangular shaped outline having one side of the triangular shape abutting said upper surface of the said rotary disc on which it is mounted and with that end of the said abutting side which is the leading end in operation being disposed nearer the axis of rotation of said rotary disc than the other end of the abutting side.

Said driving means may include means for driving said upstanding elements at a speed of rotation differing from the speed of rotation of said at least one cutting element.

In a preferred arrangement there may be provided a pair of concave discs mounted side by side with at least two cutting elements co-operating with each disc and mounted to rotate co-axially therewith in contra-rotation, and deflector means mounted to extend between the concave discs and arranged to deflect cut crop downwardly on to the discs.

Each beater may be arranged to be yielding upon impact with an obstacle more solid than the crop to be conditioned.

Each beater may be formed at least in part of resilient material.

Each beater may be pivotable, upon an impact such as aforesaid, between an operating position in which the beater angle relative to a radius of the said common axis passing through the pivot point of the beater is a predetermined angle and a relief position in which the beater angle is greater than the said predetermined angle.

Said predetermined angle may be zero so that each beater is pivotable, upon an impact such as aforesaid, between an operating position in which the beater lies along a radius of the said common axis and a relief position in which the beater is at an angle to the said radius.

There may be provided means for varying the predetermined angle which may be set at, for example 15° or 30°. By way of example, said predetermined angle may be set between 10° and 20°, or between 25° and 35°.

In operation the beaters may be urged to or constrained in the operating positions for example by centrifugal action, by shear pins or by spring means acting against stops.

The beaters may be mounted in groups in such a manner that the beaters of each group are fixed relative to each other, but are movable upon an impact such as aforesaid relative to beaters in other groups.

The beaters of each group may be mounted on a common support member which is pivotable about an axis parallel to but spaced from the said common axis.

Each beater may include an arm hinged at one end and fins disposed in the form of a V secured to the other end of the arm with the apex of the V-form directed towards the hinged end. The fins may be straight or twisted to increase the area of impact with the crop.

Preferably the beaters are so disposed that in operation the tips of the beaters tend to clear the cutter of crop. The means for driving the beaters in rotation may be arranged to rotate the beaters in such a sense that, at the lowermost point of the movement of each beater, the beater moves in the same direction as the direction of movement of the implement over the ground when in use. In such an arrangement, the beaters may be so disposed that in operation the beaters tend to raise the crop and position the crop in a position suitable for cutting.

Means may be provided for defining with the paths travelled by the tips of the beaters a chamber through which crop is carried by the motion of the beaters and in which chamber the crop is conditioned by co-operation of the beaters and the said defining means.

There may further be provided in accordance with the invention an agricultural implement for cutting and conditioning a crop comprising: a frame, a plurality of beaters for conditioning crop, first mounting means mounting said beaters on said frame for rotation about a common axis, a cutter, said cutter having at least one cutting element for cutting a crop by movement of said cutting element relative to said frame, second mounting means mounting said cutting element or elements independently of said beaters, and means for driving said beaters in rotation about said axis, said beaters being so disposed as to engage crop cut by said cutter and to condition said crop.

Such an implement may include a forage harvester coupled to said frame to receive said cut crop conditioned by said beaters, said forage harvester including a device for chopping crops coming from said beaters, and a device for delivering chopped crop from the chopping device to a container for transport.

Furthermore, in an agricultural implement according to the invention said crop coming from said beaters may be arranged to follow a different trajectory from stones picked up by said beaters, said implement including stone deflector elements positioned to deflect stones to the ground but to allow crop to pass to the chopping device.

In another arrangement of said invention, said transfer means varies the dispositions of said common horizontal axis of said beaters, the cutting and the frame between a first, cutting disposition in which said second mounting means mounts said cutting element or elements substantially below said beaters and said first mounting means mounts said beaters in co-operating relationship with said cutting element or elements such as to engage crop cut by said cutter before said cut crop falls to the ground and to condition said crop, and a second, non-cutting disposition in which said second mounting means mounts said cutting element or elements in a position in which the cutter is rendered ineffective to cut crop and said first mounting means mounts said beaters in non-co-operating relationship with said cutter and positions said beaters to engage previously cut crop lying on the ground.

Said transfer means may comprise pivot means coupling said first and second mounting means and allowing said cutter to pivot relative to said frame between said first cutting disposition and said second, non-cutting disposition.

In said second non-cutting disposition, said second mounting means may mount said cutting element or elements behind said common beater axis relative to the direction of travel of the implement.

Alternatively said transfer means may comprise guide means allowing longitudinal movement of said common beater axis relative to the frame along the intended direction of travel of the implement between said cutting and non-cutting dispositions, said common beater axis being positioned in said non-cutting disposition forward of and lower than its position in said cutting disposition.

Embodments of the present invention will now be described, by way of example, with reference to the accompanying drawings, in which:

FIG. 1 illustrates a rear elevation of an agricultural implement in accordance with the present invention;

FIG. 5 illustrates another view of one of the sets of beaters illustrated in FIG. 4;

FIG. 6 illustrates a view similar to FIG. 1, of a second embodiment of the present invention;

FIG. 7 illustrates a view on the line VII — VII in FIG. 6;

FIG. 8 illustrates a view of a flail embodied in the arrangement illustrated in FIGS. 6 and 7;

FIG. 9 is a rear elevation of an agricultural implement embodying the present invention;

FIG. 10 is an end view in the direction II in FIG. 9 after removal of the tractor and three point linkage;

FIG. 15 is a diagrammatic representation of an alternative implement embodying the invention and including a rotary cutter, FIG. 16 is a side view partly in section of an implement embodying the invention coupled to a forage harvester, and arranged in a first, cutting disposition;

FIG. 17 is a plan view of the embodiment of FIG. 16;

FIG. 18 is a side view of the machine of FIG. 16 arranged in a second, non-cutting disposition;

FIG. 19 is a side view of the machine of FIGS. 16, 17 and 18, arranged to render the forage harvester inoperative;

FIG. 20 is a side view of an alternative arrangement for coupling an implement embodying the invention to a forage harvester;

FIG. 21 illustrates a perspective view of a rotary drum mower implement in accordance with the present invention;

FIG. 22 illustrates a sectional view taken on a vertical line between the two drums of the mower and looking from right to left as seen in FIG. 21;

FIG. 23 illustrates a perspective view of a conditioning device included in the mower illustrated in FIG. 21;

FIG. 24 illustrates a side view, partly in section, of a modified driving arrangement for the mower shown in FIG. 21; and FIG. 25 is a perspective view of an alternative conditioning means.

Figures 2, 4:
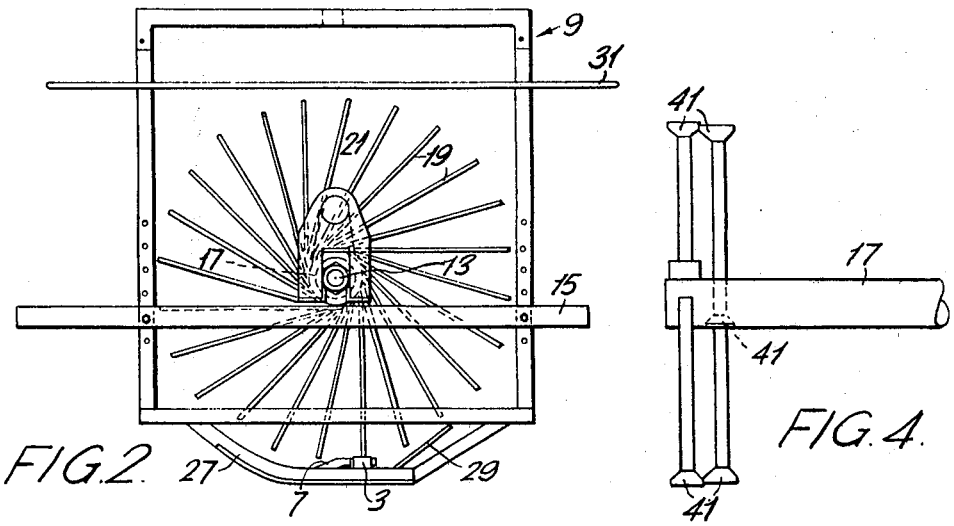
FIG. 2 illustrates a view on the line II — II in FIG. 1.
FIG. 4 illustrates a view of two sets of beaters different to the beaters illustrated in FIGS. 1 to 3.
Figures 3A, 3B, 3C:
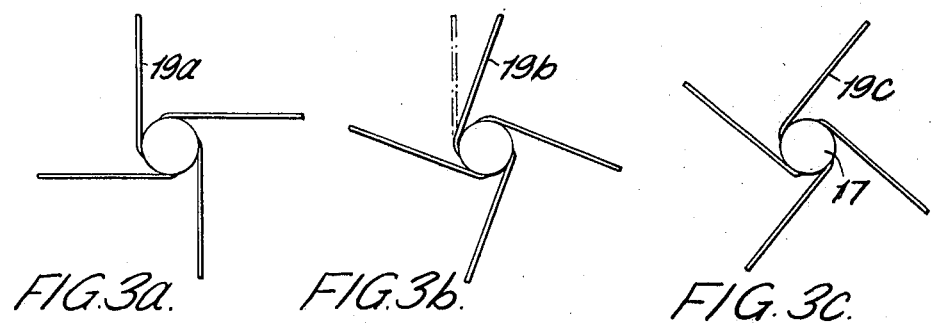
FIGS. 3a – 3f illustrate the relative orientations of six consecutive beaters in the conditioning device included in the implement illustrated in FIGS. 1 and 2.
Figures 3D, 3E, 3F:
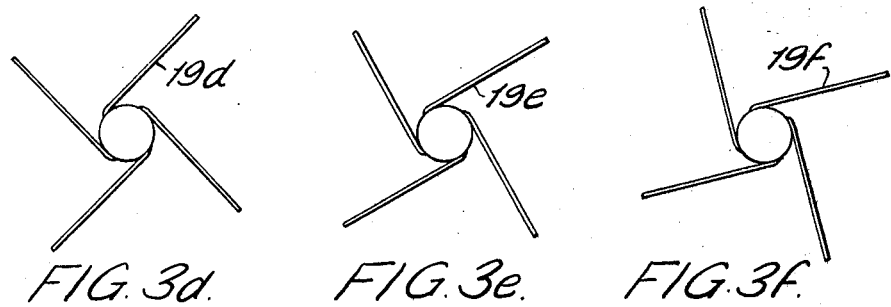

The implement illustrated in FIGS. 1 and 2 is intended to be mounted on the three-point linkage of an agricultural tractor 1 (illustrated in broken lines).

The implement includes a cutter 3, which, in the present embodiment, is a reciprocatory cutter driven from the power take-off of the tractor 1 through a pitman 5. The reciprocatory cutter 3 is of a known form including a reciprocatory cutting element comprising a bar carrying cutter blades slidable through a plurality of forwardly-facing fingers 7.

The cutter 3 is mounted on a frame of the implement which in the present embodiment extends upwardly above the cutter 3 and comprises rectangular end members 9 and transverse members 11. A dead shaft 13 extends between the end members 9 and is carried by longitudinal members 15 secured to the end members 9. The longitudinal members 15 can be selectively positioned relative to the end members 9 so that the height of the dead shaft 13 above the cutter 3 can be adjusted and the position of the vertical plane containing the axis of the dead shaft 13 relative to the cutter 3 can be selected.

Rotatably mounted on the dead shaft 13 is a tubular member 17 which forms a part of a beater arrangement and carries a plurality of beaters 19 fixedly secured thereto, but arranged to be yielding upon impact with a solid obstacle.

In the present embodiment each beater 19 is formed of rubber and four beaters 19 are uniformly angularly disposed about the axis of the tubular member 17 on a common circle to form a set of beaters. Adjacent sets of beaters are disposed so that the paths swept by the beaters of adjacent sets, upon rotation of the tubular member, about one another, as can be seen in FIG. 1.

FIGS. 3a to 3f illustrate the relative dispositions of sets of beaters 19a to 19f respectively and it will be understood that in the present embodiment the beaters of each set are offset by an angle of 15° from the beaters of an adjacent set.

The tubular member 17 may be driven in rotation by a hydraulic motor 21 having feed and return conduits 23, 25 from and to the hydraulic system of the tractor 1. Means are provided for varying the speed of rotation of the motor 21 and the direction of rotation of the motor 21.

Skids 27 are provided at the ends of the framework beneath the plane of the cutter 3.

The dead shaft 13 not only supports the tubular member 17 and beaters 19 but also serves to tie the end members 9 of the frame together.

In the present embodiment a plate 29 is disposed just behind the cutter and extends rearwardly and upwardly from the region of the cutter. The plate 29 is spaced from the path of the tips of the beaters and serves to cause cut crop to be engaged by the beaters as they rotate.

The plate 29 may have ribs formed or secured on its surface towards the flails. The ribs are preferably inclined to planes normal to the axis of rotation of the beaters and may be so disposed that the ribs at opposite sides of a plane normal to the axis of rotation and at the middle of the length of the tubular member 17, are all convergent upon the said plane in a direction away from the cutter 3. Such ribs serve to increase the conditioning of cut crop.

The sets of beaters and the plate 29 extend over the entire swath width of the cutter 3.

A rail 31 may be provided above the beaters and of greater plan area than the beaters taken together, for safety purposes.

The implement is carried from the three-point linkage of the tractor by a lower arm 33 which is connected to the tractor through a break away pivot point 35 and an upper link 37 which includes a spring 39.

In operation, the tractor 1 carries the implement over a field and the cutter 3, reciprocated by the power-take-off of the tractor 1 through the pitman 5, reciprocates and cuts a swath of crop, for example, grass. The beater arrangement is driven in rotation (counter-clockwise as seen in FIG. 2) by the motor 21 receiving its power from the hydraulic system of the tractor 1. The beater arrangement assists in moving the crop into the cutter 3 and in moving cut crop rearwardly away from the cutter. The peripheral speed of the tips of the beaters is greater than the speed of the implement over the ground so that there is relative motion between the tip of a beater when at the lowermost portion of its path of rotary movement, and the crop itself. Thus, even before the crop is cut, it may be, to some extent, conditioned by the rotating beaters. During cutting and immediately after cutting the crop is further conditioned by the beaters as it moves over the cutter bar. It is believed that the projections, such as bolt heads, which exist on the upper surface of a conventional cutter bar assist in the conditioning of the crop. The crop is subjected to further conditioning if, as in the present embodiment, the ribbed plate 29 is fitted.

After mowing and conditioning, the drive to the knife of the cutter may be disconnected or the cutter bar may be covered, and the implement may then be used for conditioning and tedding the cut crop lying on the ground. Primarily for the purpose of tedding, the direction of rotation of the beater arrangement may be reversed.

As can be seen in FIG. 1 the sum of the widths of the beaters along the beater arrangement is substantially equal to the dimension, in the direction of the axis of rotation, occupied by the beaters, i.e. there are no gaps between the paths swept by beaters of adjacent sets of beaters. FIGS. 4 and 5 illustrate an alternative form of beater which has an enlarged tip portion 41 and it is only the paths swept by the tip portions 41 which abut one another.

As can be seen in FIG. 2, the beaters are not radial to the axis of rotation but are tangential to the tubular member 17. It has been found that this arrangement reduced the amount of crop wrapping on the beaters.

It has been found that satisfactory results may be achieved if the ribs on the plate 29 are inclined at angles of 45° to a line extending along the plate 29 and parallel to the axis of rotation of the beater arrangement and also if a beater tip passes over the cutter during at least every inch of travel of the cutter over the ground at a speed of movement of the cutter over the ground of 5 m.p.h.

It has also been found that the implement described, embodying a reciprocatory cutter, may be superior to a conventional reciprocatory cutter in avoiding blocking of the cutter in laid crops particularly when the beater arrangement is positioned forwardly. In order to maintain the plate 29 at a desired spacing from the path travelled by the tips of the beaters, whatever the position of the beater arrangement, means may be provided for altering the position of the plate 29. The plate 29 may be of concave form instead of the planar form illustrated. The ribs formed on or secured to the plate may be of triangular section so that they present an edge towards the beaters. By having the ribs convergent in the direction away from the cutter, the cut crop tends to be moved from the outside of the swath towards the centre.

Whilst vertical adjustment of the position of the axis of rotation of the beater arrangement relative to the cutter is achieved in the embodiment specifically described above by selection of the position of the longitudinal members 15 carrying the dead shaft 13, the longitudinal members 15 may be fixedly secured to the frame and a variety of packing pieces may be provided for location between the dead shaft 13 and the longitudinal members to provide the same effect.

A swath board may be fitted in known manner to the right-hand (as seen in FIG. 1) end of the implement.

When a conditioning implement as described above is separate from and used separately from a cutter, the conditioning effect may be achieved either by the co-operative relationship of the beater tips with the ground or by providing a plate similar to that described above. The beater tips could be spaced from the ground or the plate, as the case may be. The beaters may be driven in rotation in a direction such that the beater tips when at the bottom of their paths of rotary motion move in a direction opposite to or the same as the direction of overall movement of the implement over the ground. When the particular beater arrangement specifically described above with reference to the FIGS. 1 to 5 is embodied in an implement not having a cutter, it would be arranged that the angle between the ground and the beater at the bottom of its rotary path of motion, the angle being considered at that side of the beater which is the leading side (only the motion of the flail being considered), is an acute angle. This arrangement is achievable because the beaters are not radial to the axis of rotation and is desirable to reduce or prevent wrapping of the crop on the beaters.

The beaters illustrated in FIGS. 1 to 5 are formed of rubber throughout their lengths and achieve resilience from the elasticity of the material from which they are formed.

The embodiment illustrated in FIGS. 6 to 8 includes beaters in the form of flails which are formed of rigid material and are hingedly connected to a shaft driven in rotation. Such flails achieve an effect of resilience from the centrifugal force acting on the flails when they are rotated, which tends to maintain the flails in radial dispositions.

The implement illustrated in FIG. 6 has a frame which includes a sub-frame 61 having upper 63 and lower 65 points for connection to the three point linkage of a tractor, only the tyres of which are shown in chain lines at 67. The sub-frame 61 carries a gear-box 69 driven by the power take-off of the tractor. The gear-box 69 has a shaft output 71 extending laterally and a V-belt 73 output which drives a pulley 75 also mounted on the frame 61.

The frame of the implement also includes a framework generally designated 77 which is mounted from the sub-frame 61 by a lower, break-away linkage 79 and an upper resilient linkage 81 which includes a spring 83.

The framework 77 carries a reciprocatory cutter 85 which is driven by a pitman 87 extending from an eccentric pin on the pulley 75. The framework 77 also carries a dead shaft 89 which is disposed parallel to and above the cutter 85. The position of the dead shaft 89 in the direction fore and aft of the framework 77, i.e. in a horizontal direction normal to its axis, may be selected and the height of the shaft 89 above the cutter may also be selected. Journalled on the dead shaft 89 is a tubular member 90 which is driven in rotation by a chain trained about tooth wheels on the member 90 and on a shaft 93 which is driven in rotation through a universal coupling 95 by the shaft 71 extending from the gear-box 69.

The tubular member 90 carries a plurality of flails 97. The flails 97 are journalled on pins 98 carried by brackets 100 on the tubular member 90. The axes of the pins 98 are parallel to the axis of the tubular member 90. The flails 97 are disposed in pairs and the members of each pair are disposed at opposite ends of a diameter of the tubular member. The pins 98 at the right side of the middle of the axial length of the tube 90 lie on two helices of one hand (of which one helix is shown) and the pins 98 at the other side of the middle of the axial length of the tubular shaft 90 lie on two helices of the opposite hand (not shown).

As can be seen in FIGS. 6 and 8, each flail includes a tubular portion 102 disposed about and rotatable relative to the pin 98 and located between the arms of the bracket 100. Extending from the tubular portion 102 and secured thereto, as by welding, is an arm 105 which carries, at its end remote from the tubular portion 102, two fins 107. The arm 105 and fins 107 are formed of strip steel. The plane of the arm 105 is normal to the axis of the pin 98. The planes of the fins 107 are such that they present an edge when considered in the circumferential direction of the path swept by them when they are rotated by rotation of the tubular member 90. The included angle between the fins 107 is approximately 60°.

Mounted above and in front of the flails is a shroud 109. The lower edge 111 of the forward, upstanding portion 113 of the shroud is disposed beneath the horizontal plane containing the axis of rotation of the tubular shaft 90. The distance between the edge 111 and the path swept by the tips of the fins 107 is adjustable, for controlling the degree of conditioning, by moving the upstanding portion 113 of the shroud fore or aft, i.e. left or right in the plane of FIG. 7, and/or by moving the position of the dead shaft 89 fore or aft. The region between the lower edge 111 and the adjacent portion of the path swept by the tips of the fins 107 constitutes a first clearance 115. A second clearance 117 is formed between the path swept by the tips of the fins 107 and the portion 119 of the shroud 109 disposed vertically above the shaft 89. The shroud 109 diverges from the path swept by the tips of the fins 107 in the region between the first and second clearances to bound a chamber 121. The shroud 109 extends rearwardly from the portion 119 thereof to prevent conditioned crop leaving the second clearance 117 being thrown upwardly.

Baffles 123 are provided behind the flail arrangement to direct crop conditioned by the flails on the end portions of the tubular shaft 90 towards the centre of the path travelled by the implement so that the conditioned crop is out of the way of the wheels 67 of the tractor upon a subsequent traverse of the implement and tractor.

Skids 125 are provided on the underside of the framework 77 at the extremities of the cutter 85.

The sub-frame 61 is provided with a second set of upper 127 and lower 129 linkage points for connection to the three point linkage of the tractor. This second set of linkage points is disposed at the side of the sub-frame 61 remote from the flail arrangement and is disposed in a plane at right angles to the first set of linkage points. The second set of linkage points serves for transporting the implement, as on a road, with the implement extending behind the tractor rather than laterally of the tractor.

In operation, the cutter 85 is reciprocated by the power take-off of the tractor through the gear-box 69, V-belt 73, pulley 75 and pitman 87. The tubular member 90 is driven in rotation by the power take-off of the tractor through the gear-box 69, shaft 71, universal coupling 95, shaft 93 and chain. The direction of rotation of the tubular member 90 is clockwise as seen in FIG. 7, that is, with the tips of the flails moving forwardly over the cutter 85 at the lower extremity of their paths of rotational movement about the dead shaft 89.

Crop cut by the cutter 85 is carried forwardly and upwardly by the flails in the first quadrant of their movement away from the cutter 85 and is carried through the first clearance 115 wherein the crop is conditioned i.e. bruised and lacerated. After passing through the first clearance 115 the crop passes into the chamber 121 wherein it spreads and is tossed around before being carried through the second and smaller clearance 117 wherein it is further conditioned before being discharged rearwardly.

It has been found that crop does not cling to the particular form of flails 97 described and illustrated because any crop tending to clink to the arm 105 or fins 107 is thrown off by centrifugal force.

The flails are illustrated in FIG. 7 in the dispositions which they assume when the tubular member 90 is rotated, that is, the flails are disposed generally radially of the shaft, by virtue of the centrifugal force. However, should one or more flails hit an obstruction such as a stone or post then the flail or flails will be deflected and move about their mounting pins 98 without causing destructive damage to the flails. The flails will resume their radial dispositions after the obstruction is cleared.

The paths swept by the fins of flails which are adjacent one another in the axial sense, overlap. It has been found that such overlap prevents crop getting to and wrapping around the tubular member 90.

Referring now to FIGS. 9 to 14, there will be described a further embodiment of the invention. Many elements shown in FIGS. 9 to 14 correspond to like elements shown in FIG. 6, and are indicated by like reference numerals. As in the embodiment of FIG. 6, the implement is intended to be mounted on the three point linkage of the tractor. The supporting and driving elements 61 to 85 correspond to those of FIG. 6. The cutter 85 is of known form including a reciprocatory cutting element comprising a bar carrying cutter blades slidable through a plurality of forwardly facing fingers. The dead shaft 89 which is disposed parallel to and above the cutter 85 in a horizontal position extends across the intended direction of travel of the implement. The position of the dead shaft 89 may be adjusted in the direction fore and aft of the framework 77, i.e. in a horizontal direction normal to its axis, and the height of the shaft 89 above the cutter may also be selected. Journalled on the dead shaft 89 are two tubular members 91 and 91' which are fixedly secured together on a common axis by a central flange 101. The tubular members 91 and 91' are driven in rotation by a chain trained about toothed wheels on the member 91 and on a shaft 93 which is driven in rotation through a universal coupling 95 by the shaft 71 extending from the gear-box 69. (It will be appreciated that the dead shaft 89 may alternatively be replaced by a driven shaft to which the beater assembly to be described hereinafter is fixedly secured.)

The two tubular members 91 and 91' form part of a beater assembly which also comprises the central flange 101, two end flanges 101' and 101'' and a number of beater bars mounted between pairs of flanges and supporting groups of beaters 97. The end flanges 101' and 101'' are in register with the central flange 101 and fixedly secured to those ends of the tubular members 91 and 91' which are remote from the central flange 101. As is best shown in FIG. 3, each beater bar 130 comprises a right angle section steel bar secured, for example, by welding, to end plates 131 and 132 which are positioned at either end of the beater bar normal to the length of the bar. Each end plate 131 is pivotted on the associated flange 101, 101' or 101'' to allow rotation of the beater bar 130 about an axis parallel to and spaced from the dead shaft 89. The plates 130 are arranged so that the beater bar 130 is spaced further from the dead shaft 89 than the pivot pin 99. Spaced further again from the dead shaft 89 on each of the end plates 131 are a number of adjustment holes 132 which, by rotation about the pivot pin 99, may be aligned selectively with an adjustment hole 133 in the associated flange 101, 101' or 101''. Each end flange 101' and 101'' carries a knife 100' to cut a clean edged swathe in operation.

The beater assembly has three illustrated modes of operation shown particularly in FIGS. 4, 5 and 6 respectively. In the first mode, shown in FIG. 4, each beater bar is allowed to rotate freely on its pivot pins 99 so that in operation the beaters 97 are thrown out to a radial operating position.

In the second mode, shear pins 134 are secured through the adjustment holes 133 on the flanges 101', and through selected adjustment holes 132 in the end plates 131. Corresponding shear pins are inserted through the holes 133 in the other end plates 101 and 101''. This arrangement allows the beaters to be rotated in an operating position which has a selected, predetermined angle to the strictly radial position, the angle being indicated in FIG. 13 as $\alpha$. The selection of the adjustment holes 132 allows variation of the angle for example to angles of 15° or 30°. If required, the beaters may be secured in a strictly radial position.

Figure 14:
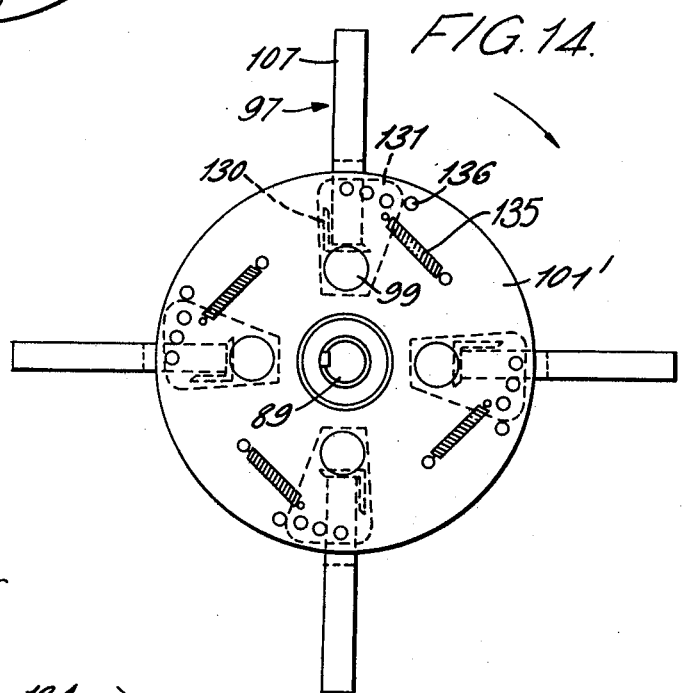
FIG. 14 is an end view similar to the view of FIG. 12 but showing an alternative beater assembly in which the beaters are spring biassed against a stop pin.

In FIG. 14 there is shown a third mode of operation of the beater assembly, where tension springs 135 are provided linked between each end plate 131 and the associated flange 101, 101' or 101''. The springs urge the beaters into a radial operating position against stop pins 136 projecting from the associated flange and engaging the edges of the end plates 131. Thus even when the beater assembly is stationary, the beaters are maintained in the radial operating positions by the tension springs, and remain in those positions during operation. The tension spring is arranged to be on the leading side of the beater assembly during rotation, as is the stop pin 136.

Further combinations of these modes may be utilised. For example the beaters may be free swinging against stops which define the beater angle in the operating position as a predetermined angle, or the beaters may be spring biassed against such stops.

considering the three modes of operation, it will be seen that each mode allows the beaters to be yielding upon impact with an obstacle more solid than the crop which is being conditioned. Upon such an impact the beater bar pivots backwards and the beaters pivot to a relief position. In the first mode of operation shown in FIG. 12, the centrifugal action of rotation of the beaters maintains the beaters in the operating position, but allows yielding movement away from the operating position upon striking an object.

Figure 13:
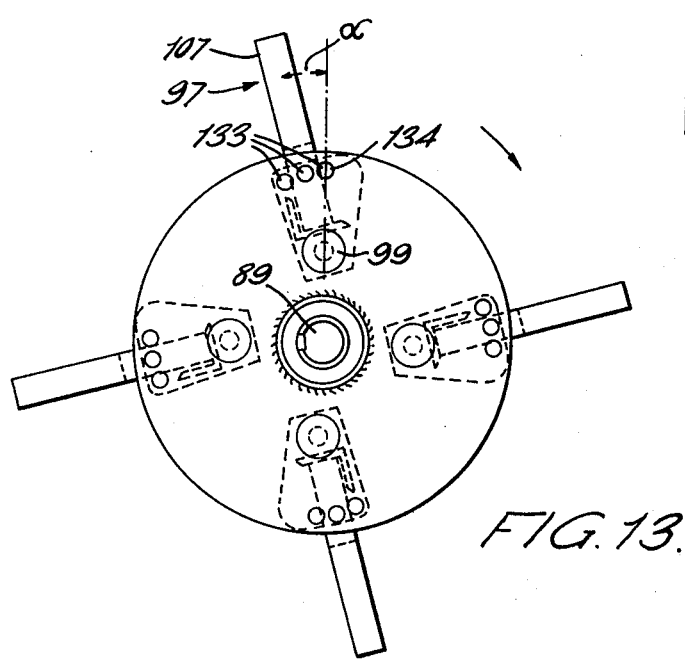
FIG. 13 is an end view of part of a beater assembly similar to the view of FIG. 12 but illustrating an alternative beater assembly using shear pins.

In the arrangement of FIG. 13, in the second mode of operation, the beaters are yielding upon impact with an obstacle by virtue of the shear pins 134. It is a particular advantage of the invention that if in operation, after striking an obstacle, one of the shear pins is sheared, it is not necessary to stop the conditioning operation to replace the shear pin. This is because the beater bar from which the shear pins have been removed, reverts to the first mode of operation, and can continue so to operate until replacement of the shear pins at a later more convenient time.

In the arrangement of FIG. 14, the beaters are yielding upon striking an object by virtue of the extension of the tension springs 135 upon such impact. After such an impact, the beater assembly automatically returns to the operating position.

It will be appreciated that it is a particular advantage of the present invention that embodiments can be constructed allowing a choice of mode of operation in the field according to the particular crop to be conditioned. Thus shear pins and springs can easily be added or removed and adjustment of the angle $\alpha$ can be made from time to time during conditioning operation. By way of example, the angle $\alpha$ may conveniently be chosen between 10° and 20° and between 25° and 35°.

Figure 11:
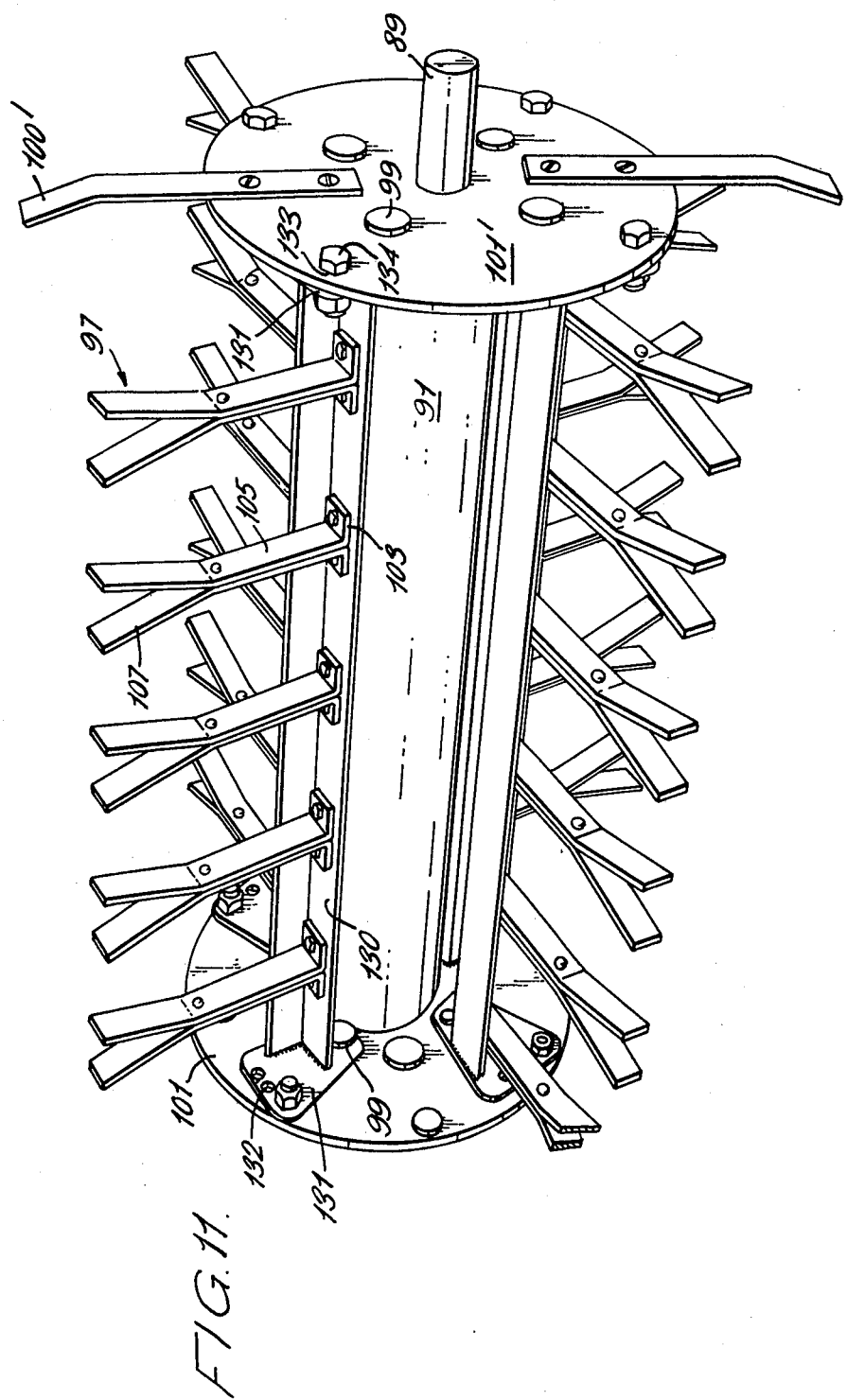
FIG. 11 is a perspective view of half the beater assembly shown in FIG. 9.
Figure 12:
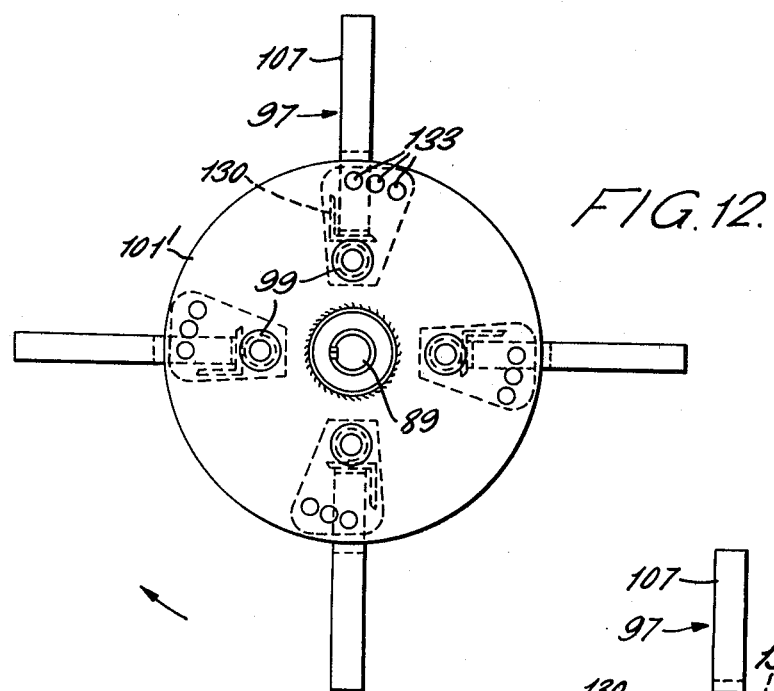
FIG. 12 is an end view of part of the beater assembly taken in the direction II in FIG. 9 and illustrates a free pivotting beater assembly.

As can be seen in FIG. 11, each beater includes a base portion 103 secured to the beater bar 130. Extending from the base portion 103 and integral therewith is an arm 105 which carries, at its end remote from the base portion 103, two fins 107. The base portion 103, arm 105 and fins 107 are formed integrally of strip steel. The plane of the arm 105 is normal to the axis of the pin 99. The planes of the fins 107 are such that they present an edge when considered in the circumferential direction of the path swept by them when they are rotated by rotation of the tubular member 91. The included angle between the fins 107 is approximately 30°.

An alternative arrangement for the shape of the ends of the beaters, is a beater having a Y shaped tip but with the upper ends of the Y twisted to increase the area of impact.

Further alternative yielding means which may be incorporated into the beater mountings include metelastic type rubber mountings or the use of a detent system with spring loaded projections from the end plates engaging detents on the flanges, or vice versa.

Considering again the general beater arrangement shown in FIGS. 9 and 11, the beater bars 130 are arranged symmetrically about the axis of the dead shaft 89 but the beater bars of the two tubular members 91 and 91' are arranged to be 45° out of phase with each other to reduce drive load peaks on the driving mechanism. The spacing between the beaters 97 on adjacent beater bars is such that the paths swept by the beaters of adjacent beater bars upon rotation of the tubular member abut or, as shown in FIG. 9, overlap one another. That is to say that the base portion 103 of beaters 97 on each beater bar are positioned in line with the gaps between base portions 103 on the next adjacent beater bar. It is not essential that the tips of the beaters follow paths which abut or overlap each other, but this is a preferred arrangement, as it is found to reduce the amount of crop which becomes entangled with the beaters.

Referring to FIG. 10 there is mounted above and in front of the beaters a shroud 109. The lower edge 111 of the shroud is disposed beneath the horizontal plane containing the axis of rotation of the tubular members 91 and 91'. The distance between the edge 111 and the path swept by the tips of the fins 107 may be adjustable, for controlling the degree of conditioning, by moving the shroud fore or aft, i.e. left or right in the plane of FIG. 10, and/or by moving the position of the dead shaft 89 fore or aft. The region between the lower edge 111 and the adjacent portion of the path swept by the tips of the fins 107 constitutes a gap 115. The shroud 109 follows the path swept by the tips of the fins 107 to bound a chamber 121. The shroud 109 extends rearwardly and downwardly from a portion 119 at the end of the chamber 121 to prevent conditioned crop leaving the chamber 121 being thrown upwardly.

The diameter of the beater assembly to the tips of the beaters may for example be 22 inches. Typically, in one arrangement, the axis of the dead shaft may be positioned 40 mm to the rear of the reciprocating blade of the cutter 85, and the clearance between the tips of the beaters and the shroud edge 111 may be 60 mm.

In operation, the cutter 85 is reciprocated and the tubular members 91 and 91' are driven in rotation by the power take-off of the tractor as described with reference to FIG. 6. The direction of rotation of the tubular members 91 and 91' is clockwise as seen in FIG. 10, that is, with the tips of the flails moving forwardly over the cutter 85 at the lower extremity of their paths of rotations movement about the dead shaft 89.

Crop cut by the cutter 85 is carried forwardly and upwardly by the beaters in the first quadrant of their movement away from the cutter 85 and is carried through the gap 115 to the chamber 121 wherein the crop is conditioned, i.e. bruised and lacerated. For many crops it is an advantage that in the arrangement shown when the crop is passed through the chamber 121 stem first and remains in this alignment while being conditioned. This produces the effect that the thicker parts of the crop which require most conditioning receive most bruising and lacerating from the beaters. This is in distinction to many other forms of conditioning apparatus in which the conditioning elements tend to work mainly on the upper, more fragile parts of the crop. Thus, in a preferred embodiment of the present invention, the front of the housing bends the crop forward putting the stems under stress just before cutting. After cutting, the butt ends spring into the paths of the beaters which bend them sharply upwards and accelerate the plants in the same direction as the rotation of the beater assembly.

It has been found that the movement of air created by the beaters during the first quadrant of their movement away from the cutter 85 is such as to place the crop in a favourable condition for cutting. Such positioning can also be effected by direct contact between the beaters and the uncut crop. Also the fact that the tips of the beaters when adjacent the cutter 85 are moving forwardly over the cutter tends to clear the cutter 85.

An implement embodying the invention may be embodied in a harvester which includes a device for chopping crop coming from the implement and a device for delivering chopped crop from the chopping device to a container for transport. Such a harvester may be regarded as resembling a forage harvester but it has the advantage over a conventional forage harvester that without substitution of components it can be used for harvesting a standing crop or a previously cut and wilted crop.

The implement may be modified so that the beater assembly may be moved to a position forward of and lower than that illustrated in FIGS. 1 and 2 so that, with the cutter 85 masked, rendered inoperative, or removed, the implement may be used for conditioning and tedding an already cut crop lying on the ground.

It has been found that the crop issuing from the implements described above is well fluffed up so that air circulation is facilitated and that the crop is lacerated and bruised, i.e. conditioned, so that the rate of loss of the moisture in the crop is improved.

If a crop to be cut and conditioned is found to be laid, the beater arrangement is moved forwardly of the cutter so that it tends to raise the crop and position the crop favourably for cutting.

It has been found that the implement also may be superior to a conventional reciprocatory cutter in avoiding blocking of the cutter in laid crops, particularly when the beater arrangement is positioned forwardly.

The facility for selecting the height of the beater arrangement relative to the cutter is optional but it is thought that it may be desirable to select different heights for different crops and crop conditions.

Other forms of beater may be incorporated in an implement in accordance with the present invention and amongst such other forms of flail may be mentioned a flat leaf spring; a flail of which only a portion adjacent its base is elastic, the remainder being rigid; a beater which is formed of rigid portions hingedly or otherwise connected to allow relative movement between the portions; and a chain.

Whilst the invention has been described above in embodiments in which the cutter is a reciprocatory cutter, it is to be understood that other forms of cutter, for example, multiple disc rotary mowers, may be used in carrying the invention into effect.

One of the main features of embodiments of the present invention is that the implement can be made versatile and adaptable to differing crop conditions. For example the severity of treatment of the crop can be adjusted by varying the flail angle so that the rest of the mower conditioner can be made more simply and less flexibly designed. Many of the adjustments of the shroud which have been described by way of example may thus be dispensed with in practice.

The various modes of operation described each have advantages which are useful in particular conditions. For example a grouping of beaters on a common pivotted beater bar results in simplicity, cheapness of production and ready replacement of individual beaters and component parts of the beater assembly.

Greater momentum at the tips of the beaters may be attainable than with individually pivotted beaters, and this can result in a more uniform bruising of the crop. Where appropriate this can be arranged to give better clearing of the cutter bar working beneath the beater assembly.

The feature of locking the beater bars in substantially radial position, can reduce the power requirement for operation but maintain a high level of severity of crop treatment where this is required.

The feature of locking the beater bars in selected positions to reduce the impact angle under certain working conditions, and at the same time increase the clearance between the beater tips and the shroud, allows a control means for decreasing the severity of crop treatment. In such circumstances this will, of course, also result in less power being used. The use of shear pins provides overload protection, but still allows satisfactory performance by reverting to the free pivotting mode if one of the shear pins fails.

FIG. 15 is a diagrammatic representation of an alternative embodiment of the invention in which the reciprocatory cutter 85 of FIGS. 1 to 6 is replaced by a rotary cutter 85'. FIG. 15 is given merely to illustrate one possible general layout of such an alternative, and elements corresponding to elements described with reference to FIGS. 1 to 6 are indicated in FIG. 15 by corresponding reference numerals.

There will now be described with reference to FIGS. 16 to 19 an adaptation of the agricultural implement for cutting and conditioning a crop which has been described with reference to the previous FIGS. 1 to 14. The embodiment described with reference to FIGS. 9 to 14 is particularly suitable for use with the adaptation of FIGS. 16 to 19. The adaptation is concerned with the coupling of the cutting and conditioning implement to a conventional forage harvester.

Referring firstly to FIGS. 16 and 17, a conventional forage harvester indicated generally at 200 comprises a main frame and general housing 201, a pair of land wheels 202 and 203 and an output device 204 for transferring chopped crop to a container for transport.

The housing 201 is coupled to a cowling shroud 209 of a agricultural implement for cutting and conditioning a crop indicated generally at 205. The coupling preferably allows articulation. As the agricultural cutting and conditioning implement may be substantially the same as described with reference to previous figures, the details of the implement will not be described. The implement comprises essentially a plurality of beaters 206 mounted on a rotor 207 for rotation about a rotor axis 208, and a reciprocatory cutter 213 mounted on side members 211 and 212.

The cutter 213 and the beater rotor 207 are pivotted by way of the side members 211 and 212 about a pivot axis 210 spaced from the rotor axis 208. Pivot means allow rotation of the cutter 213 between a first cutting disposition which will be described with reference to FIG. 16, and a second non-cutting disposition which will be described hereinafter with reference to FIG. 18.

Thus the beaters 206 are mounted on a first mounting means comprising the rotor 207, and the cutting elements of the cutter 213 are mounted on a second mounting means comprising the back plate and end supports of the cutter 213 as has been described with reference to previous figures. The rotor 207 and the cutter 213 are both mounted on a transfer means constituted by the two side members 211 positioned on either side of the implement 205. The side members 211 are braced across the bottom by the cutter 213 and across the top by a cross tie 214. The rotor 207 is journalled into the side members 211 to allow rotation about a substantially horizontal axis, and the whole structure of the rotor 207, cutter 213, cross tie 214 and side members 211 is pivotted on pivot means to pivot about the pivot axis 210 spaced from the beater axis 108 by a distance small compared with the distance between the beater axis 208 and the cutter 213. The purpose of this eccentric pivotting mounting will be explained hereinafter with reference to FIG. 18.

The agricultural implement 205 also includes drive means 215 for driving the beaters in rotation and for driving the reciprocatory cutter, by suitable gearing means which may be as described hereinbefore with reference to previous figures.

As can be seen in the plan view of FIG. 17, the cutting and conditioning implement 205 is mounted in front of and centrally of the forage harvester 200 and is mounted in an off-set position from the towing tractor (not shown) as has been described hereinbefore for example with reference to FIG. 9. The rotor 207 and cutter 213 are driven from the power take off of the tractor into a drive means 215, (which may also be as hereinbefore described) and the forage harvester rotary elements are driven by a shaft 216 leading from the drive means 215 to a gear box 217 on the forage harvester.

Referring now mainly to FIG. 16, there are positioned between the cutting and conditioning implement 205 and the intake and compaction rollers 218 and 219 of the forage harvester 200, two vertical deflector plates 219 and 220 positioned one on each side of the housing 201, and two adjustable crop deflectors 221 and 222. The crop deflector 222 is pivotable about a pivot 223 and is positioned by a pin 224 located in guide slots 225 in the side walls of the housing 201. The crop deflector 221 is pivotted at a pivot 226 about an arc defined by a pin 227 extending into guide slots 228 in the side walls of the housing 201. The end of the crop deflector 221 carries an adjustable extension 229 by which the length of the crop deflector 221 can be adjusted and locked by a locking screw 230. The extension 229 co-operates with a sliding stone deflector 231 positioned transversely across the roof of the shroud 209 between the implement 205 and the forage harvester 200 to separate the stones from conditioned crop as will be described hereinafter. The crop deflectors 221 and 222 each consist of metal plates extending across the width of the housing 201.

The forage harvester 200 is of conventional design and comprises intake and compaction rollers 218 and 219, a feed conveyor 235, and an overhead floating roller 236. The conveyor 235 and roller 236 feed crop through further guide rollers 237 and 238 to a precision chopper 239 which impels the chopped crop along a conduit 240 to the delivery chute 204.

There will now be described with reference to FIGS. 16 and 18 respectively the two main dispositions of the beater rotor 207 and the cutter 213 which may be operated with the forage harvester 200 depending on the crop conditions and operation required. (A third disposition will then be described with reference to FIG. 19, which third disposition corresponds to the use of the implement 205 as has been described with reference to previous figures.)

In FIG. 16, the machine is shown in a first, cutting disposition, in which the cutter 213 is positioned below the beater rotor 207, with the cutter positioned to cut crop and the beaters 206 positioned in co-operating relationship with the cutter 213 so as to condition crop cut by the cutter before the cut crop falls to the ground. The crop deflectors 222 and 221 are positioned in their highest and lowest positions, respectively to leave a channel between the two crop deflectors to pass crop to the intake and compaction rollers 218 and 219 of the forage harvester. In operation the rotor 207 impels the conditioned crop along a trajectory leading between the crop deflectors 221 and 222 to the rollers 218 and 219, but the beaters 206 impel any stones picked up along a different, higher trajectory. The stones then strike the stone deflector 231 and are deflected downwards between the rotor 207 and the lower crop deflector 221. The stone deflector 231 is adjustable by sliding movement in the roof of the shroud 209 along the line of travel of the machine, and the extension 229 is adjustable to allow a suitable gap between the rotor 207 and the crop deflector 221 to pass the deflected stones to the ground.

In FIG. 18, the machine is shown in a second non-cutting disposition in which the cutter 213 is pivotted by the side members 211 about the pivot axis 210 to a position behind the axis 208 of the rotor 207. In this position, the cutter 213 is rendered inoperative to cut crop, and in addition the drive from the drive means 215 may be disconnected from the cutter 213 if required. In this second disposition the crop deflectors 221 and 222 and the stone deflector 231 may remain in the same position as for FIG. 16. The beaters 206 are moved by the said eccentric action to a lower position relative to the main frame, where they are now positioned to engage cut crop lying on the ground. The previously cut crop is picked up and conditioned and passed between the crop deflectors 221 and 222 to the intake rollers 218 and 219 of the forage harvester. The stone deflector 231 again operates to separate the stones from the conditioned crop. Thus in the second, non-cutting disposition the beater rotor 207 is positioned lower than its position in the first cutting disposition, and the cutter 213 is positioned higher and rearwardly of its position in the first cutting position.

Referring now to FIG. 19 the machine may be operated in a third disposition, in which the beater rotor 207 and the cutter 213 are positioned as for the first cutting disposition of FIG. 16, but the crop deflectors 221 and 222 are positioned respectively in their upper and lower positions so as to form a continuous deflector arrangement deflecting cut and conditioned crop away from the rollers 218 and 219 and down to the ground. The crop so cut and conditioned is also deflected by the deflectors 220 which form a swarf of conditioned crop. In the third disposition of FIG. 19, the implement 205 operates as a cutting and conditioning device such as has been described with reference to previous figures, and the forage harvester 200 is not used. In such operation, the drive member 216 may be disconnected from the forage harvester 200.

Thus it will be seen that when the implement embodying the present invention for cutting and/or conditioning crop is coupled to a forage harvester, a versatile machine is produced capable of operating in three different modes of operation. The stone separation by the adjustable stone deflector allows an improved high speed device whether in the first or second dispositions, as previously known forage harvesters are severely limited by the damage caused to the precision chopper by stones which are passed by the intake rollers. For this reason conventional forage harvesters pick up previously cut crop by lifting tines which are relatively slow.

The conditioning beaters 206 of the present invention also serve a useful function in that some stones which are collected are thrown forwards of the machine rather than passing to the stone deflector 231, and such stones and other stones may be ridden over by the cutter on skids 213.

The well known advantages of a precision chopper over conventional forage harvesters using flail cutting, can be made available by embodiments of the present invention at a much higher speed than previously obtained with a precision chopper. A main advantage of the embodiments described in FIGS. 16 to 19 over conventional multi-purpose forage harvesters, is the ease with which the disposition of the elements can be changed from cutting to non-cutting disposition, as compared with an arrangement in which the whole front end of the forage harvester would need to be removed and changed in order to change from a cutting disposition to a non-cutting disposition.

There will now be described with reference to FIG. 20 an alternative arrangement of a combination of a cutting and conditioning implement according to the present invention with a forage harvester. Elements in FIG. 20 which correspond to elements in FIGS. 16 to 19 will be indicated by like reference numerals. Most of the description of the operation of the embodiment of FIG. 20 corresponds to that of FIGS. 16 to 19, so that the description will merely be of the differences.

In the embodiment of FIG. 20, the rotor 207 is mounted on the main frame by an adjustable trunnion means 232 which is mounted to slide along a slot 233 in the main frame 210. The slot is inclined to the horizontal and allows movement of the rotor 207 from a position directly above the cutter 213 (shown in dotted lines in FIG. 20) and a position forward of the cutter bar 213 (shown in full lines in FIG. 20). In the former position, the shroud 209 slides back with the rotor.

When the rotor 207 is positioned directly above the cutter 213, the rotor 207 and cutter 213 are in a first cutting disposition such that in operation the cutter 213 cuts standing crop, which is conditioned by the beaters 207 and impelled to the intake rollers 218 and 219 of the forage harvester. When the rotor 207 is mounted at the lower end of the guide slots 233, it is positioned in a second non-cutting disposition, in which the cutter 213 is rendered inoperative. In this second disposition the beaters 206 engage previously cut crop lying on the ground and condition it and pass it to the intake rollers 218 and 219.

It will be appreciated that the elements shown in FIG. 20, are positioned to illustrate the general arrangement of the alternative embodiment, but are provided merely by way of diagrammatic representation.

There will now be described with reference to FIGS. 21 through 25, an agricultural implement embodying the invention incorporating two rotary cutters.

The implement illustrated in FIG. 21 is intended to be mounted on the three point linkage of an agricultural tractor and and for this purpose it includes two lower link pins 301 and an upper link 303 which is pivotable at 305 and is illustrated in an inoperative position. The pins 301 and link 303 are secured to a frame 307 from which extends a boom 309 so arranged as to extend laterally of the tractor when the mower is mounted on the tractor for use.

The implement is driven by the power take-off of the tractor through a shaft 311 having universal joints 313. The drive is turned through a right angle by a triple pulley and belts which drive a shaft 317 through bevel gears.

Mounted on the boom 309 for rotation about vertical axes are two rotary devices 319A, 319B which include generally cylindrical portions 321A, 321B at the lower ends of which are concave or dished discs 323A, 323B having the concave sides thereof facing downwards.

The rotary devices 319A, 319B are driven in rotation by the shaft 317 through right angle drives 325 (one of which may be seen in FIG. 22). The two drives 325 differ in that the rotary devices 319A, 319B are driven in contra-rotation and it is arranged that the portions of the peripheries of the two discs 323A, 323B in the nip region 327 are moving rearwardly, i.e. in the direction opposite to the direction of movement of the mower over the ground.

Below each disc 323A, 323B is a skid in the form of an upwardly-concave dished disc 329 (see FIG. 22). The discs 329 are so mounted that they are free to rotate about the same axes as the rotary devices 319A, 319B but they are not driven in rotation.

The peripheries of each disc 323A or 323B and its associated disc 329 are spaced from one another so that there is a continuous gap 331 when viewed in the horizontal direction, as may be seen in FIG. 22.

Each rotary disc 323A, 323B has associated with it two knives 333A, 333B respectively constituting cutting elements and secured as will be described hereinafter with reference to FIG. 24. The knives are not rigidly secured but are free to pivot about axes spaced from and substantially parallel to the axes of rotation of the rotary devices 319A, 319B. The two knives associated with each rotary device are located on a diameter of the device and the knives of the two rotary devices are so disposed that when one knife 333A is located in the nip region 327 the knives 333B are each a quadrant away from the nip region. The knives 333A, 333B project, when in use, from their associated discs to such an extent that the path swept by the knives 333A overlaps the path swept by the knives 333B in the nip region 327.

In use the mower is carried over the ground by the tractor with the rotaty devices 319A, 319B driven in rotation at high speed. Centrifugal force causes the knives to assume dispositions tending towards radial. The knives whilst in such dispositions cut the grass or other crop and tend to sweep it backwardly between the two cylindrical portions 321A, 321B.

Mounted on the upper surface of each of the two discs 323A, 323B are two conditioning elements 335 (constituting beaters), one of which is illustrated in FIG. 23. Each element 335 has a profile (i.e. when viewed approximately radially of the axis of rotation) of general triangular form and is secured to a disc 323A or 323B by means of two threaded studs 337 which extend from the base 339 of the triangular shape through apertures in the disc. Nuts are threadedly engaged with the studs on the underside of the disc 323A or 323B. It is arranged that the base 339 is offset from a chord of the disc with that end which is leading, when in use, being disposed on a smaller radius than the trailing end. Also the general plane of each element 335 is displaced from the vertical with the general plane of the triangular shape being inclined towards the axis of rotation in the upward direction.

Each element may be bulbous in the region of the middle of the base 339 on its face towards the axis of rotation.

In the present embodiment each element 335 is formed of a bent rod 341, the ends of which constitute the studs 337. The rod 341 is shrouded with sheet metal. However, it will be evident that other manners of forming the elements, such as by casting or moulding, may be adopted, and other materials such as rubber or plastics may be used.

Mounted from the boom 309 to depend into the region between the cylindrical portions 321A, 321B of the rotary devices 319A, 319B are deflector means 343. In the present embodiment the deflector means consists of a sheet 345 of rigid material, e.g. metal, resiliently mounted from the boom 309 by a hinge 347 having a pivot axis parallel to the longitudinal axis of the boom 309. At its lower extremity 349 the sheet 345 has an integral flange 346 extending generally horizontally in the direction of movement of the discs through the nip region 327. The junction of the flange 346 with the body of the sheet 345 presents a smooth arcuate surfce, rather than a sharp edge. Movement of the lower extremity 349 of the sheet rearwardly, i.e. in the same direction as the direction of movement of the peripheral portions of the discs 323A, 323B in the nip region 327, is resiliently opposed by a spring 351 acting between an arm 353 upstanding from the sheet 345 above the hinge 347, and a bracket 355 secured to the boom 309.

The lower edge 349 of the deflector sheet 345 is spaced above the paths swept by the conditioning elements 335. The side edges 357 of the sheet 345 are spaced by only small distances from the cylindrical portions 321A, 321B of the rotary devices 319A, 319B.

A shroud 358 is provided over the hinge 347 and been found, in certain cases, to obviate the necessity to perform a primary tedding operation.

A yet further advantage which has been noted when cutting a crop such as long and tangled lucerne is that the conditioning elements prevented many blockages which would have occurred had they not been present.

Whilst an embodiment of the invention has been described in which there are only two rotary devices, it will be understood that embodiments of the present invention may include more than two rotary devices, e.g. four or even six rotary devices. In such cases each disc would be provided with conditioning elements and deflector means would be provided between the adjacent disc arrangements. Furthermore there may be applications in which a single disc mower may be used and may benefit from the addition of conditioning elements according to the invention.

In the embodiment specifically described above, the deflector means consists of a resiliently mounted rigid sheet. It is to be understood that a sheet of resilient material, e.g. textile reinforced sheet rubber, may be used instead of a resiliently mounted arrangement. It is desirable that the deflector means should be able to move rearwardly and upwardly in case the mower encounters an object which it moves to pass above the nip region.

In one embodiment of the present invention the following values exist:

| | |
|---|---|
| Distance between centres of studs 337 | 6 inches |
| Distance between plane normal to centre lines of studs 337 at upper end of studs and the top of the conditioning element 335 | 4 inches |
| Angle of inclination of general plane of conditioning element 335 to said plane normal to centre line of studs 337 | 65° |
| Length of leading face of conditioning element 335, approximately | 6 inches |
| Length of trailing face of conditioning element 335, approximately | 4½ inches |
| On a disc 323A, 323B of 13 inch radius the studs 337 were fixed at radii of | 9⅞ inches and 11⅞ inches |
| the rod 41 was | ½ inch diameter M.S. bar |
| the shrouding for the rod 341 was | 16 S.W.G. M.S. sheet. | upper portion of the sheet 345, which serves to prevent cut crop from becoming tangled in the hinge.

In operation, the peripheral speed of the discs 323A, 323B is much greater than the speed of movement of the mower as a whole, over the ground, so that there is relative movement between the portions, of the peripheries of the discs 323A, 323B instantaneously in the nip region 327, and the ground. Grass or other crop cut by the knives 333A, 333B tends to rise up over the disc 323A, 323B and is carried round to the region between the cylindrical portions 321A 321B. As cut crop ridges up over the discs it is impinged upon by the conditioning elements and the stems of the cut crop are broken and bruised. Such breaking and bruising is known as "conditioning" and results in accelerated and improved drying. As the cut crop is carried round in piled up state towards the region between the cylindrical portions 321A, 321B it is both retarded and deflected downwardly into the zones swept by the conditioning elements so that further conditioning is effected.

An additional advantage provided by the conditioning elements is that they tend to distribute the cut crop behind the mower in a fashion which is more evenly spread than would otherwise be achieved, which has With reference to FIG. 24 there will be described the drive arrangement of the embodiment of FIGS. 21, 22 and 23 whereby the speed of rotation of the conditioning elements is arranged to be different to and less than the speed of rotation of the knives 333A and 33B.

Referring to FIG. 24, the drive to the rotary unit 319A consists of two sets of bevel gears 360 and 361, driven by the shaft 317. The bevel gears 360 are coupled to a vertical drive shaft 362 passing along the axis of the drum and carrying at its lower end a horizontal rotary plate 363. The knives 333A are pivotally mounted on the rotary plate 363 and are rotated by the shaft 362 to effect cutting as has been explained hereinbefore. The rotary plate 363 is housed within the cowling member constituted by the dished disc 323A which is also mounted for rotation on the shaft 352 together with the drum 321A. The disc 323A and drum 321A are driven by the second bevel gear 351 driven by the shaft 317. The gears are so arranged that the rate of rotation of the dished disc 323A (carrying the conditioning elements 335) rotates at a lesser speed than the cutting rotary plane 363, for example a half the speed of the disc 363. As before, the lower disc 329 is free to rotate but is not driven in rotation.

The separate drum drive is taken from the main transverse shaft through bevel gears and on to an internal ring gear in such a way that the drum speed is approximately half the knife speed.

In FIG. 25 is shown a perspective view of a conditioning means which is an alternative to that shown in FIG. 23. The alternative conditioning means 335' has a base 339' and three rods 341' which form the same outline as the conditioning means 335 in FIG. 23 but provide a greater number of edges for bruising and lacerating the crop. The mounting, inclination and position of the alternative conditioning means 335' may be the same as those shown in FIG. 23.

We claim:

1. A forage harvester comprising:
   a conditioning rotor having conditioning elements extending outwardly therefrom for conditioning crop by rotation about a horizontal axis;
   means for driving the conditioning rotor in rotation in a sense such that at the lowermost point of the movement of each said conditioning element the element moves in the same direction as the intended direction of forward travel of the implement;
   mounting means for mounting the conditioning rotor in a position to collect crop during forward travel of the implement;
   means on the harvester for chopping crop coming from the conditioning rotor;
   hood means extending over and adjacent the conditioning rotor, the conditioning rotor co-operating with the hood means to effect a degree of separation of stones from crop by concentrating said stones in a peripheral path around the inside of the hood means; and
   a stone deflector member extending downward from said hood means and positioned at least adjacent the rear of said conditioning rotor in the said peripheral path in a position such as to be struck by said stones and such as to deflect said stones into a trajectory which differs from that of any crop which may strike said deflector member by virtue of the greater momentum of the stones relative to the crop, said stone deflector member deflecting said stones to pass along a downward path clear of said chopping means and said conditioning rotor.

2. A forage harvester according to claim 1 wherein the conditioning rotor is spaced from the chopping means, the speed of rotation of the conditioning rotor is sufficient to propel the crop across the space between the rotor and the intake to the chopping means, and the stone deflector member is positioned in the region of the said space and arranged to deflect the said stones downwardly through said space to the ground.

3. A forage harvester according to claim 1 including cutting means for cutting crop during forward travel of the harvester, the mounting means mounting the conditioning rotor in a position such as to engage crop cut by the cutting means before the cut crop falls to the ground.

4. A forage harvester according to claim 1 wherein the conditioning rotor comprises an array of discrete conditioning elements distributed axially along the rotor, each element comprising at least one arm extending outwardly from the axis of the rotor, and each element having a shape and inclination such as to tend to fling any stones present in the crop outwardly against said hood means.

5. A forage harvester comprising:
   a conditioning rotor for conditioning crop by rotation about a horizontal axis, the conditioning rotor comprising an array of discrete conditioning elements distributed axially along the rotor, each element comprising at least one arm extending outwardly from the axis of the rotor;
   means for driving the conditioning rotor in rotation in a sense such that at the lowermost point of the movement of each conditioning element the element moves in the same direction as the intended direction of forward travel of the implement;
   mounting means for mounting the conditioning rotor in a position to collect crop during forward travel of the implement;
   means on the harvester for chopping crop coming from the conditioning rotor;
   means on the harvester for delivering chopped crop from the chopping means to a container for transport;
   hood means extending over and adjacent the conditioning rotor, each conditioning element having a shape and inclination such as to tend to fling any stones present in the crop outwardly against said hood means, and the conditioning rotor and the hood means co-operating with each other to effect a degree of separation of stones from crop by concentrating said stones in a peripheral path around the inside of the hood means which carries said stones downwardly between said chopping means and said conditioning rotor; and
   a stone deflector member extending downward from said hood means and positioned at least adjacent the rear of said conditioning rotor in the said peripheral path in a position such as to be struck by said stones and such as to deflect said stones into a trajectory which differs from that of any crop which may strike said deflector member by virtue of the greater momentum of the stones relative to the crop, said stone deflector member deflecting said stones to pass along a downward path clear of said chopping means and said conditioning rotor.

6. A forage harvester comprising:
   a frame for movement over a crop to be cut;
   cutting means for cutting the crop by driven movement of one or more cutting elements relative to the frame;
   a conditioning rotor for conditioning crop by rotation about a horizontal axis, the conditioning rotor comprising an array of discrete conditioning elements distributed axially along the rotor, each element comprising at least one arm extending outwardly from the axis of the rotor;
   means for driving the conditioning rotor in rotation in a sense such that at the lowermost point of the movement of each conditioning element the element moves in the same direction as the intended direction of forward travel of the implement;
   means on the harvester for chopping crop coming from the conditioning rotor;
   means on the harvester for delivering chopped crop from the chopping means to a container for transport;
   mounting means for mounting the conditioning rotor in a position to engage crop cut by the cutting means before the cut crop falls to the ground, and to convey crop towards the chopping means;

hood means extending over and adjacent the conditioning rotor, each conditioning element having a shape and inclination such as to tend to fling any stones present in the crop outwardly against said hood means, and the conditioning rotor and the hood means co-operating with each other to effect a degree of separation of stones from crop by concentrating said stones in a peripheral path around the inside of the hood means; and a stone deflector member positioned in the said peripheral path in a position such as to be struck by said stones and such as to deflect said stones into a trajectory which differs from that of any crop which may strike said deflector member by virtue of the greater momentum of the stones relative to the crop, said stone deflector member deflecting said stones to pass clear of said chopping means and said rotor.

7. A forage harvester comprising:

a conditioning rotor for conditioning crop by rotation about a horizontal axis;

mounting means for mounting the conditioning rotor in a position for collecting crop during forward travel of the implement;

the conditioning rotor comprising an array of discrete conditioning elements distributed axially along the rotor, each element comprising at least one arm extending outwardly from the axis of the rotor, the spacing between the conditioning arms on the rotor and the length of each arm relative to its width being such as to enable the conditioning arms to penetrate and move through the crop while it is being conveyed by the rotor;

means for driving the conditioning rotor in rotation in a sense such that at the lowermost point of the movement of each conditioning element the element moves in the same direction as the intended direction of forward travel of the implement, and for driving the rotor at a high speed for teasing out the crop being conveyed by the rotor;

hood means extending over and adjacent the conditioning rotor;

means on the harvester for chopping crop coming from the conditioning rotor; and stone deflector means mounted on said hood means and extending downward therefrom in a position adjacent the rear of said conditioning rotor such as to be struck by stones leaving the conditioning rotor, and positioned at a location and an angle for deflecting the stones downwardly between and clear of the conditioning rotor and the chopping means along a trajectory which differs from that of any crop striking the deflector means by virtue of the greater momentum of the stones relative to the crop.

8. A forage harvester according to claim 7 wherein each outwardly extending arm has a length at least four times its width taken in a direction along the axis of the rotor.

9. A forage harvester as claimed in claim 8 wherein each conditioning element includes fins disposed in the form of a V with the apex of the V form directed towards said rotor.

* * * * *